(12) United States Patent
Pancras et al.

(10) Patent No.: US 11,546,150 B2
(45) Date of Patent: Jan. 3, 2023

(54) SECURE SCALABLE LINK KEY DISTRIBUTION USING BOOTSRAPPING

(71) Applicant: ARRIS Enterprises LLC, Suwanee, GA (US)

(72) Inventors: Siby Mathew Tarigopla Pancras, San Jose, CA (US); Jari T. Malinen, Santa Clara, CA (US)

(73) Assignee: ARRIS ENTERPRISES, LLC, Suwanee, GA (US)

( * ) Notice: Subject to any disclaimer, the term of this patent is extended or adjusted under 35 U.S.C. 154(b) by 13 days.

(21) Appl. No.: 17/031,395

(22) Filed: Sep. 24, 2020

(65) Prior Publication Data
US 2021/0091941 A1 Mar. 25, 2021

Related U.S. Application Data

(60) Provisional application No. 62/906,063, filed on Sep. 25, 2019.

(51) Int. Cl.
*H04L 9/08* (2006.01)
*H04L 9/32* (2006.01)

(52) U.S. Cl.
CPC .......... *H04L 9/0869* (2013.01); *H04L 9/0891* (2013.01); *H04L 9/0894* (2013.01); *H04L 9/3215* (2013.01); *H04L 9/3226* (2013.01); *H04L 2209/80* (2013.01)

(58) Field of Classification Search
None
See application file for complete search history.

(56) References Cited

U.S. PATENT DOCUMENTS

| 6,665,293 | B2 | 12/2003 | Thornton et al. |
| 7,885,413 | B2 | 2/2011 | Vasic et al. |
| 8,375,207 | B2 * | 2/2013 | Dangoor ............... H04L 63/062 713/168 |

(Continued)

FOREIGN PATENT DOCUMENTS

WO WO 2007107976 A2 * 9/2007

OTHER PUBLICATIONS

International Search Report and the Written Opinion of the International Searching Authority corresponding to International Patent Application No. PCT/US2020/049837 (11 pages) (dated Dec. 4, 2020).

*Primary Examiner* — Bassam A Noaman
(74) *Attorney, Agent, or Firm* — Steven Stupp; Stewart Wiener

(57) ABSTRACT

An electronic device (such as an IoT controller) that distributes a link key is described. During operation, while an administrator is logged in, the electronic device may receive the link key using a secure widget, where the link key may facilitate secure communication via a link. Then, the electronic device may generate an access key, and may generate an encrypted version of the link key based at least in part on the access key and the link key, where the access key enables access to the link key based at least in part on the encrypted version of the link key. Next, the electronic device may store the link key, the access key and/or the encrypted version of the link key in a trusted envelope or partition in the memory with encryption. Moreover, when the administrator logs out, the electronic device may disable access to the trusted envelope.

19 Claims, 12 Drawing Sheets

(56) References Cited

U.S. PATENT DOCUMENTS

| | | | |
|---|---|---|---|
| 10,257,179 B1 | 4/2019 | Saylor et al. | |
| 2004/0025028 A1 | 2/2004 | Takeuchi | |
| 2010/0318786 A1* | 12/2010 | Douceur | H04L 9/3247 |
| | | | 713/155 |
| 2010/0325732 A1* | 12/2010 | Mittal | H04L 63/065 |
| | | | 726/26 |
| 2017/0093565 A1* | 3/2017 | Yang | H04W 12/06 |
| 2017/0126642 A1* | 5/2017 | Basin | H04L 9/3226 |
| 2017/0180419 A1* | 6/2017 | Pedersen | H04W 12/04 |
| 2019/0034235 A1 | 1/2019 | Fang et al. | |
| 2019/0182038 A1* | 6/2019 | Shanks | H04L 9/0894 |
| 2021/0288804 A1* | 9/2021 | Kassner | H04L 9/3234 |

\* cited by examiner

SECURE SCALABLE LINK KEY DISTRIBUTION USING BOOTSRAPPING

CROSS REFERENCE TO RELATED APPLICATIONS

This application claims priority under 35 U.S.C. 119(e) to: U.S. Provisional Application Ser. No. 62/906,063, "Secure Scalable Link Key Distribution Using Bootstrapping," filed on Sep. 25, 2019, by Siby Mathew Tarigopla Pancras, et al., the contents of which are herein incorporated by reference.

This application includes subject matter related to U.S. patent application Ser. No. 16/185,002, entitled "Flexible Gateway for Heterogeneous-Device Management," by Dileepan Narayanan, et al., filed Nov. 8, 2018, the contents of which are herein incorporated by reference.

BACKGROUND

Field

The described embodiments relate to techniques for communication. Notably, the described embodiments relate to techniques for securely distributing a communication or link key using bootstrapping.

Related Art

The increasing capabilities of electronic devices are dramatically changing our lives. For example, the processing and communication capabilities of portable electronic devices, such as cellular telephones, provide users with the capabilities of a handheld computer. In conjunction with expanded networks, such as the cellular-telephone networks and the Internet, these capabilities are allowing individuals to: access vast amounts of information; identify and interact with other people, organizations and governments; access information at arbitrary locations; and/or perform a wide variety of tasks. Collectively, these technologies have resulted in a significant increase in economic activity (such as online financial transactions, which are sometimes referred to as 'ecommerce') and productivity, and enable a host of applications that enhance user experiences and quality of life.

Recently, it has been proposed that further advances can be achieved by enhancing the capabilities of other electronic devices, which are pervasive but largely ignored by most users (such as in appliances, infrastructure, transportation, farming, etc.). Notably, by embedding sensors, actuators and communication capabilities in these 'background' electronic devices, the so-called 'Internet of things' (IoT) can provide a distributed network that facilities the exchange of data, remote sensing and control, and a diverse set of applications that facilitate more direct integration of the physical world into computer-based systems. In principle, the IoT offers the promise of highly automated systems that improve efficiency, enhance accuracy and expand economic activity in a diverse set of markets, such as: smart cities, hospitality, retail, education, housing, and manufacturing.

In practice, there are still obstacles to achieving the goals of the IoT. Notably, the IoT marketplace is diverse, with competing commercial entities offering devices/endpoints, networks, middleware and cloud-based platforms and services. Moreover, the marketplace lacks interoperability standards, which restricts communication and the exchange of data among components in these systems. The resulting lack of coordination can make it difficult to scale IoT systems while maintaining or ensuring quality of service.

Consequently, the IoT remains fragmented and siloed, which forces users to purchase additional dedicated equipment (such as separate gateways for electronic devices from different manufacturers and providers, and/or additional network switches to connect to different cloud-based service providers) in an attempt to build integrated solutions. However, these efforts often result in custom and expensive solutions with redundant equipment and limited flexibility, all of which is frustrating to users and limits market traction of the IoT.

SUMMARY

In a first group of embodiments, an electronic device that distributes a link key is described. This electronic device includes: a network node; an interface circuit that is communicatively coupled to the network node; a processor; and memory that stores program instructions, where, when executed by the processor, the program instructions cause the electronic device to perform one or more operations. Notably, during operation, the electronic device may receive an administrator login credential. While the administrator is logged in, the electronic device may receive, at the interface circuit, a link key using a secure widget, where the link key facilitates secure communication via a link. Then, the electronic device may create an access key, and may generate an encrypted version of the link key based at least in part on the access key and the link key, where the access key enables access to the link key based at least in part on the encrypted version of the link key. Next, the electronic device may store at least two of the link key, the access key and the encrypted version of the link key in a trusted envelope or partition in the memory with encryption. Moreover, when the electronic device receives a logout instruction for the administrator, the electronic device may disable access to the trusted envelope.

Note that metadata may be stored with the link key, the access key and the encrypted version of the link key in the trusted envelope. This metadata may specify when the access key was created and how long it is valid or when the access key expires.

Moreover, the access key may be created based at least in part on the administrator login credential (such as a password). For example, the access key may be a random or a pseudorandom number. In some embodiments, the access key is created based at least in part on a policy or privilege associated with the administrator.

Furthermore, when the electronic device subsequently receives the administrator login credential, the electronic device may re-enable access to the trusted envelope. Then, when the electronic device receives, at the interface circuit, information that indicates that a gateway has joined a network, the electronic device may provide, from the interface circuit, the encrypted version of the link key addressed to the gateway. Moreover, when the electronic device receives, at the interface circuit and associated with the gateway, an access request for the access key, the electronic device may provide, from the interface circuit, the access key addressed to the gateway. Furthermore, when the electronic device receives a second logout instruction for the administrator, the electronic device may disable access to the trusted envelope.

Note that the encrypted version of the link key and the access key may be provided using different communication channels.

Additionally, note that the access request may be associated with a second electronic device that is associated with the gateway.

In some embodiments, the electronic device provides the access key based at least in part on the access request, authorization associated with the administrator and/or an identifier of the second electronic device. For example, the electronic device may receive, at the interface circuit, the authorization associated with the administrator prior to providing the access key and/or the identifier may be included in the access request.

Note that the link may be associated with a ZigBee communication protocol.

Moreover, the gateway may include an access point or an eNodeB.

In some embodiments, instead of creating the access key and/or generating the encrypted version of the link key, the electronic device may obtain the access key and/or the encrypted version of the link key. For example, the electronic device may access the access key and/or the encrypted version of the link key in memory. Alternatively, the electronic device may receive the access key and/or the encrypted version of the link key from another electronic device or computer.

Another embodiment provides a computer-readable storage medium with program instructions for use with the electronic device. When executed by the electronic device, the program instructions cause the electronic device to perform at least some of the aforementioned operations in one or more of the preceding embodiments.

Another embodiment provides a method, which may be performed by the electronic device. This method includes at least some of the aforementioned operations in one or more of the preceding embodiments.

In a second group of embodiments, a gateway that distributes an access key for a link key is described. This gateway includes: a network node; an antenna node; an interface circuit that is communicatively coupled to the network node and the antenna node; a processor; and memory that stores program instructions, where, when executed by the processor, the program instructions cause the gateway to perform one or more operations. Notably, during operation, the gateway may receive, at the interface circuit, an encrypted version of the link key from an electronic device, where the link key facilitates secure communication via a link. Then, the gateway may receive, at the interface circuit, a communication associated with a second electronic device, and the gateway may provide, from the interface key, an access request for the access key addressed to the electronic device, where the access key enables access to the link key based at least in part on the encrypted version of the link key. Next, the gateway may receive, at the interface circuit, the access key from the electronic device. Moreover, the gateway may optionally provide, from the interface circuit, the access key addressed to the second electronic device. Furthermore, the gateway may access the link key based at least in part on the encrypted version of the link key and the access key, and may install the link key in the interface circuit. Additionally, the gateway may discard or erase the access key from the memory (e.g., outside the interface circuit).

Note that the encrypted version of the link key and the access key may be received using different communication channels.

Moreover, the communication associated with the second electronic device may occur during association or establishing of a connection between the gateway and the second electronic device.

Furthermore, the access request may include an identifier of the second electronic device.

Additionally, the link may be associated with a ZigBee communication protocol.

In some embodiments, the gateway may include an access point or an eNodeB.

Another embodiment provides a computer-readable storage medium with program instructions for use with the gateway. When executed by the gateway, the program instructions cause the gateway to perform at least some of the aforementioned operations in one or more of the preceding embodiments.

Another embodiment provides a method, which may be performed by the gateway. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
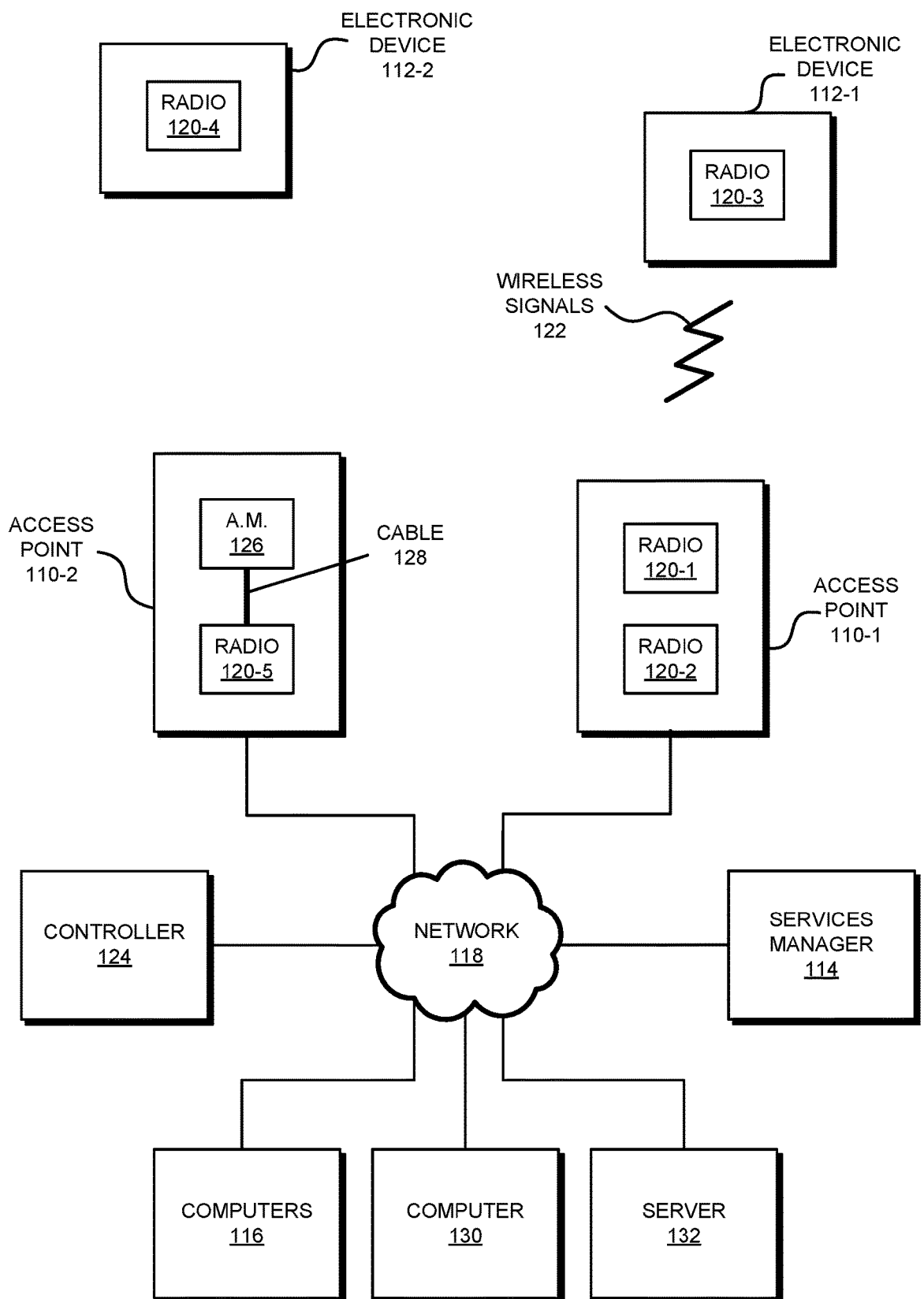
FIG. 1 is a block diagram illustrating an example of communication among electronic devices in accordance with an embodiment of the present disclosure.

In a first group of embodiments, an electronic device (such as an IoT controller, e.g., a services manager) that distributes a link key is described. During operation, while an administrator is logged in, the electronic device may receive the link key (e.g., from an external source) using a secure widget. The link key may facilitate secure communication via a link. Then, the electronic device may create an access key, and may generate an encrypted version of the link key based at least in part on the access key and the link key, where the access key enables access to the link key based at least in part on the encrypted version of the link key. Next, the electronic device may store the link key, the access key and/or the encrypted version of the link key in a trusted envelope or partition in the memory with encryption. Moreover, when the administrator logs out, the electronic device may disable access to the trusted envelope, e.g., by erasing instances of access key material or the access key that is used to open the encrypted secure or trusted envelope.

Subsequently, when the administrator logs in again, the electronic device may re-enable access to the trusted envelope. Then, when the electronic device receives information that indicates that a gateway (such as an access point or an eNodeB) has joined a network, the electronic device may provide the encrypted version of the link key to the gateway (e.g., by transmitting one or more packets that are addressed to the gateway, where the one or more packets include the encrypted version of the link key). Moreover, when the electronic device receives an access request for the access key from the gateway (such as an access request associated with a second electronic device, e.g., an electronic lock that is connected to or associated with the gateway), the electronic device may access the trusted envelope and provide the access key to the gateway (e.g., by transmitting one or more packets that are addressed to the gateway, where the one or more packets include the access key). Furthermore, when the administrator logs out again, the electronic device may disable access to the trusted envelope.

In a second group of embodiments, the gateway that distributes the access key is described. During operation, the gateway may receive the encrypted version of the link key from the electronic device. Then, the gateway may communicate with the second electronic device, and the gateway may provide an access request for the access key to the electronic device, where the access key enables access to the link key based at least in part on the encrypted version of the link key. Next, the gateway may receive the access key from the electronic device. Moreover, the gateway may optionally provide the access key to the second electronic device. Furthermore, the gateway may access the link key based at least in part on the encrypted version of the link key and the access key, and may install the link key in an interface circuit in the gateway (such as in a radio). Additionally, the gateway may discard or erase the access key from memory in the gateway.

By securely distributing the link key and/or the access key, these communication techniques may facilitate secure communication via the link, e.g., a link between the gateway and the second electronic device. For example, the communication techniques may address challenges in securely provisioning radios on a link that uses a ZigBee communication protocol. Moreover, the communication techniques may not require that the gateway store the access key or that the gateway is pre-provisioned with a token or another security device. In these ways, the communication techniques may simplify and reduce the costs associated with distributing the link key, while maintaining end-to-end security. This may allow the communication techniques to be scaled to a large number of electronic devices. These capabilities may improve the user experience both in setting up and using electronic devices that provide secure IoT applications.

In the discussion that follows, electronic devices (such as an access point or an eNodeB) communicate frames or packets in accordance with one or more wireless communication protocol, such as an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), BLE (from the Bluetooth Special Interest Group of Kirkland, Wash.), ZigBee (from the ZigBee Alliance of Davis, Calif.), Z-Wave (from Sigma Designs, Inc. of Fremont, Calif.), LoRaWAN (from the Lora Alliance of Beaverton, Oreg.), Thread (from the Thread Group of San Ramon, Calif.), IPv6 over low-power wireless personal area networks or 6LoWPAN (from the Internet Engineering Taskforce of Fremont, Calif.) and/or another type of wireless interface. In the discussion that follows, Wi-Fi, ZigBee and BLE are used as illustrative examples. However, a wide variety of communication protocols (such as Long Term Evolution or LTE, another cellular-telephone communication protocol, etc.) may be used.

Moreover, the access point or eNodeB may communicate with other access points, eNobdeBs and/or computers in a network using a wired communication protocol, such as an IEEE 802.3 standard (which is sometimes referred to as 'Ethernet'), Message Queueing Telemetry Transport (MQTT) and/or another type of wired interface. In the discussion that follows, MQTT and Ethernet are used as illustrative examples.

FIG. 1 presents a block diagram illustrating an example of communication among one or more access points 110, one or more electronic devices 112 (such as a cellular telephone), a services manager 114, one or more computers 116 associated with service providers (or third parties, which are sometimes referred to as 'providers'), and computer 130 of an administrator of services manager 114 in accordance with some embodiments. Notably, access points 110 may communicate with each other and other components in FIG. 1 using wireless and/or wired communication. Note that access points 110 may include a physical access point and/or a virtual access point that is implemented in software in an environment of an electronic device or a computer. Furthermore, at least some of access points 110 may communicate with electronic devices 112 using wireless communication.

The wired communication among access points 110 and other components (such as services manager 114) may occur via network 118 (such as an intra-net, a mesh network, point-to-point connections and/or the Internet) and may use a network communication protocol, such as Ethernet or MQTT. Moreover, the wireless communication using Wi-Fi or another wireless communication protocol (such as BLE or ZigBee) may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, wireless communication by access points 110 also involves the use of dedicated connections, such as via a peer-to-peer (P2P) communication techniques.

Figure 12:
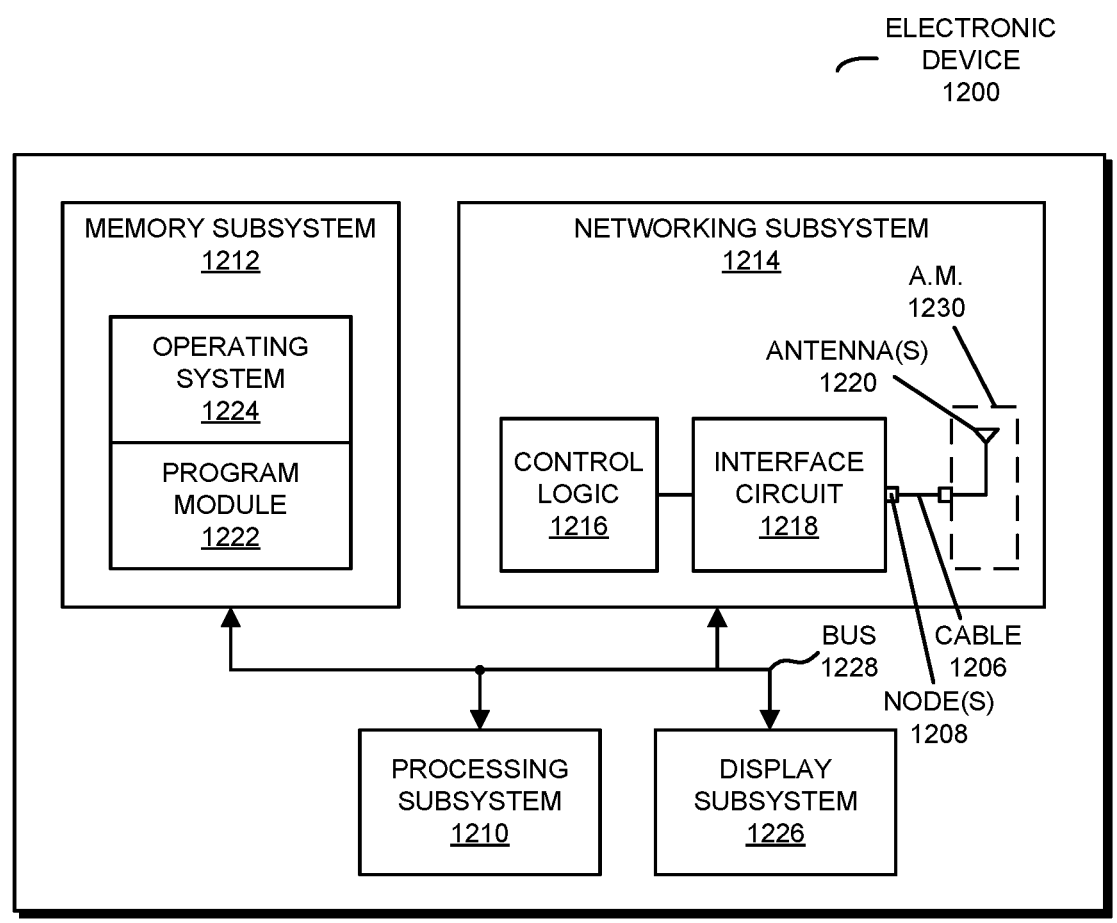
FIG. 12 is a block diagram illustrating an example of an electronic device in accordance with an embodiment of the present disclosure.

As described further below with reference to FIG. 12, access points 110, electronic devices 112, services manager 114, computers 116 and/or computer 130 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120. In some embodiments, such as in access point 110-2, radio 120-5 is coupled to a separate antenna module (A.M.) 126 by a cable 128.

As can be seen in FIG. 1, wireless signals 122 (represented by a jagged line) are transmitted from radios 120-1 and/or 120-2 in access point 110-1. These wireless signals may be received by radio 120-3 in electronic device 112-1. Notably, access point 110-1 may transmit frames or packets. In turn, these frames or packets may be received by electronic device 112-1. Moreover, access point 110-1 may allow electronic device 112-1 to communicate with other electronic devices, computers and/or servers via network 118.

Note that the communication between at least pairs of components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 122 with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously and as described further below with reference to FIG. 2, one of access points 110 (such as access point 110-1) may perform at least some aspects of the communication techniques. This may allow access points 110 to become one-touch points of access to the IoT using a single framework. Notably, access points 110 may facilitate the dynamic integration of multiple electronic devices and service providers in a variety of applications, as well as easy deployment and upgrades.

In some embodiments, access point 110-1 may provide co-existing or concurrent communication using different communication protocols. Notably, access point 110-1 may include radio 120-1 and/or 120-2. These radios may, respectively, communicate using different communication protocols in a shared band of frequencies (such as the 2.4 GHz ISM band of frequencies). For example, radio 120-1 may be a BLE radio and radio 120-2 may be a Wi-Fi radio (or vice versa). During operation, radio 120-2 may perform a scan of available channels in the shared band of frequencies. Radio 120-2 may detect or determine that BLE and Wi-Fi may each use one of primary channels 1, 6 and 11 (such as channel 1). Alternatively, radio 120-2 may receive, from radio 120-1 (if access point 110-1 includes radio 120-1), information specifying one or more used channels in the shared band of frequencies that are reserved or used by the BLE communication protocol. Next, radio 120-2 may mask the one or more used channels from the available channels (such as by masking out 8-16 MHz corresponding to primary channel 1), and radio 120-2 may select one or more channels from remaining available channels for use with the Wi-Fi communication protocol, such as a new primary channel. Thus, because Wi-Fi has the ability to hop among different channels while connected BLE and ZigBee typically do not frequency-hop, channel masking may be used to facilitate co-existing and/or concurrent communication among access points 110 and electronic devices 112 using two different communication protocols in the shared band of frequencies.

While access point 110-1 is illustrated with separate radios 120-1 and 120-2, in some embodiments these radios are combined into a single radio or integrated circuit. Alternatively or additionally, packet-traffic arbitration between radios 120-1 and 120-2 may be used. Notably, when one of the radios is transmitting or receiving using a channel and a first communication protocol, it may communicate a hold (such as a hold signal or instruction) to the other radio, so that the other radio temporarily does not communicate using the channel and a second communication protocol.

In some embodiments, additional communication capability is added to access point 110-1 via a plug-in module, such as a dongle (which is sometimes referred to as a 'USB dongle') that is inserted into a USB port in access point 110-1. For example, radio 120-1 may be a USB dongle that adds BLE communication capability to access point 110-1. In conjunction with software on access point 110-1, this may enable communication-protocol recognition and translation, as well as communication via another communication protocol (as was just described).

Moreover, as described further below with reference to FIGS. 3 and 4, additional infrastructure may perform or implement at least some aspects of the communication techniques. Notably, services manager 114 may enable dynamic integrated solutions with disparate (and otherwise potentially incompatible) components, such as one or more sensors (which are sometimes referred to as an 'IoT device') and/or actuators from different manufacturers (which are sometimes referred to as an 'IoT device'), and/or one or more service providers. These different components may be associated with different (unrelated) entities, such as different companies or organizations. Note that in the present discussion an 'IoT device' may have a sensing capability and/or an actuation capability.

Notably, services manager 114 may include: a gateway that communicates with one or more of access point 110 via a communication protocol (such as MQTT); a control and management plane with system-configuration information; and a data plane with a registry of the one or more electronic devices 112, rules for the one or more electronic devices 112, and application programming interfaces (APIs) for service providers. Services manager 114 may provide a programmable, modular and integrated system for flexibly and securely exchanging data and associated services among access points 110, electronic devices 112, services manager 114, computers 116 and/or computer 130. Note that resources in services manager 114 that are associated with different service providers may be contained in separate virtual machines. Alternatively or additionally, the resources from different service providers may be included in 'containers' (such as Docker containers). Furthermore, the control and management plane and the data plane may be implemented in separate software stacks in services manager 114.

In some embodiments, optional controller 124 is used to configure settings of access points 110, such as transmit power, a transmit antenna pattern, a receive antenna pattern, etc. Thus, controller 124 may provide Wi-Fi control and management planes. Moreover, controller 124 may initialize IoT services that are facilitated and managed by services manager 114, i.e., services manager 114 may provide IoT data plane and control and management plane. In addition, services manager 114 may provide a partner portal for Wi-Fi and IoT management by one or more of computers 116. Note that in some embodiments, controller 124 may be combined with services manager 114 in a single device. Furthermore, note that controller 124 and/or services manager 114 may be local devices where access points 110 and electronic devices 112 are installed and used, or may be at a remote location (such as a cloud-based implementation).

In these ways, the communication techniques may enable the IoT. Notably, access points 110 and services manager 114 may provide a single-access network for Wi-Fi and IoT traffic. Access points 110 and services manager 114 may: manage network across different physical layers, provide IoT device-to-backend management, and/or distributed decision-making (such as at the edge immediately behind a firewall versus backend processing). Moreover, access points 110 and services manager 114 may be: transport protocol agnostic, architecture agnostic to the transport layer, and/or may support a variety of communication or transport protocols, such as ZigBee, BLE and/or other IoT communication protocols. Furthermore, access points 110 and services manager 114 may: provide a network backbone for a variety of services, enable end-to-end services for multiple connected ecosystems, and/or provide end-to-end solutions with a simplified value chain and a single network.

Moreover, the communication techniques may allow access points 110 and/or services manager 114 to provide flexible and secure exchange of data and the associated services. For example, the communication techniques may remove siloes between components from different manufacturers and providers (such as local electronic devices that provide IoT devices and actuators and service providers), and may facilitate dynamic services for customers (such as services that are configured and provided as needed). Furthermore, services manager 114 may facilitate interoperability of disparate components from different manufacturers and providers without requiring a standard or retrofitting of legacy equipment. Additionally, services manager 114 may eliminate the need for additional (and expensive) dedicated equipment (such as separate gateways for electronic devices from different manufacturers and/or additional network switches to connect to different cloud-based service providers). Thus, services manager 114 may enable integrated solutions and the IoT, which may allow a wide variety of valued-added applications and services, enhanced economic activity and enhanced user experiences and customer satisfaction.

Furthermore, the fragmented and distributed nature of the platforms and shortcomings in bootstrapping among IoT protocols (e.g., with ZigBee 2.0 where end electronic devices often bootstrap from a well-known key or via out-of-line provisioning to the end electronic devices, and for which most present IoT electronic devices still do not have an upgrade path) typically creates a problem when trying to provide a secure key bootstrap technique. Therefore, there is a need for a scalable secure bootstrapping technique, e.g., so that bootstrapping can be done as a one-time operation from the network side. Moreover, a link key bootstrap technique is needed so there is no dependence on the availability of hardware trusted devices and so that the link key is not accessible via inspection of the system.

Consequently, as described further below with reference to FIGS. 7-11, services manager 114 may distribute a link key and an access key to a gateway (such as one of access points 110, e.g., access point 110-1, or an eNodeB) for use in secure communication with one of electronic devices 112 (such as electronic device 112-1). Notably, while an administrator is logged in to services manager 114 (e.g., using computer 130), services manager 114 may receive the link key from server 132 using a secure widget, where the link key facilitates secure communication via a link (such as a link that uses a ZigBee or an IEEE 802.15.4 communication protocol). In some embodiments, the link key may be a symmetric shared secret that has, e.g., 128 bits.

Then, services manager 114 may create an access key, and may generate an encrypted version of the link key based at least in part on the access key and the link key, where the access key enables access to the link key based at least in part on the encrypted version of the link key. For example, the access key may enable decryption of the encrypted version of the link key. Note that the access key may be created based at least in part on an administrator login credential (such as a password). In some embodiments, the access key may be a random or a pseudorandom number. Moreover, the access key may be created based at least in part on a policy or privilege associated with the administrator.

Next, services manager 114 may store the link key, the access key and the encrypted version of the link key in a trusted envelope or partition in memory in services manager 114 with encryption. In some embodiments, metadata may be stored with the link key, the access key and the encrypted version of the link key in the trusted envelope. This metadata may specify when the access key was created and how long it is valid or when the access key expires. Moreover, when the administrator logs out, services manager 114 may disable access to the trusted envelope.

Subsequently, when the administrator logs in to services manager 114 again, services manager 114 may re-enable access to the trusted envelope. For example, after logging in, the administrator may set services manager 114 into a key access mode. Then, when the services manager 114 receives information that indicates that a gateway (such as access point 110-1) has joined a network (such as a WLAN), services manager 114 may provide the encrypted version of the link key to access point 110-1. For example, services manager 114 may detect access point 110-1 in the network. Alternatively, the administrator may provide the information to services manager 114.

Moreover, electronic device 112-1 may associate with access point 110-1 (i.e., a connection may be established between access point 110-1 and electronic device 112-1), such as during an installation or commissioning process (e.g., of an electronic lock). Electronic device 112-1 may have an associated identifier (such as a MAC address). After electronic device 112-1 associates with access point 110-1 access point 110-1 may provide an access request for the access key to services manager 114. This access request may include the identifier associated with electronic device 112-1. Next, in response to the access request, services manager 114 may provide the access key to access point 110-1. Note that the provisioning of the access key to access point 110-1 may be further based at least in part on the identifier of electronic device 112-1 (such as whether the identifier is included in a predefined list of electronic devices that are allowed to receive the access key) and/or authorization from the administrator (which may be provided based at least in part on out-of-band communication between an installer of electronic device 112-1 and the administrator). In some embodiments, the encrypted version of the link key and the access key may be provided using different communication channels, different bands of frequencies and/or different communication techniques.

After receiving the access key, access point 110-1 may optionally provide the access key to electronic device 112-1. Furthermore, access point 110-1 may access the link key based at least in part on the encrypted version of the link key and the access key, and may install the link key in an interface circuit in access point 110-1 (such as in a radio). Additionally, access point 110-1 may discard or erase the access key from memory in access point 110-1.

Moreover, during the installation process, electronic device 112-1 may receive the encrypted version of the link key from the installer or a vendor that provides or manufactures electronic device 112-1. Thus, when electronic device 112-1 receives the access key, electronic device 112-1 may access the link key based at least in part on the encrypted version of the link key and the access key, and may install the link key in an interface circuit in electronic device 112-1 (such as in a radio). Then, electronic device 112-1 may discard or erase the access key from memory in electronic device 112-1. Alternatively, electronic device 112-1 may receive the link key from the installer or the vendor (and, thus, may not need the access key). In this way, the link between access point 110-1 and electronic device 112-1 may be provisioned with the link key for secure communication.

After the administrator logs out of services manager 114 again, services manager 114 may disable access to the trusted envelope. Thus, the trusted envelope may only be accessible when the administrator is logged in. This may ensure that the stored sensitive information (such as the link key, the access key and the encrypted version of the link key) are only accessible during brief time intervals.

While the communication techniques in FIG. 1 are illustrated using access points 110 and services manager 114, in other embodiments at least some of the access points 110 may be eNodeBs (not shown). Moreover, an eNodeB may communicate with at least one of access points 110, e.g., using an LTE-WLAN aggregation (LWA) communication protocol.

We now further describe embodiments of access points 110 and services manager 114. Current IoT-device gateways often operate within closed proprietary ecosystems, which can make it difficult to integrate a wide array of management platforms and disparate IoT-device networks. These problems are typically compounded by architectural limitations. For example, the gateways may have monolithic non-modular architectures that often are not scalable and customizable for different IoT-device network deployment scenarios, and these gateways are usually tied to expensive purpose-built hardware.

In order to address these challenges, access points 110 may aggregate and disburse data across disparate IoT devices, and may include data-acquisition and data transformation capabilities (such as a data acquisition and transformation engine or control logic). In addition, services manager 114 may include: a gateway abstraction service, an internal software development kit (SDK) that allows management of a control and management plane, and/or a partner services SDK that allows partner services providers to manage contained resources in services manager 114 that are associated with the respective partner services providers. Note that communication between services manager 114 and access points 110 may use a communication protocol, such as MQTT.

Figure 2:
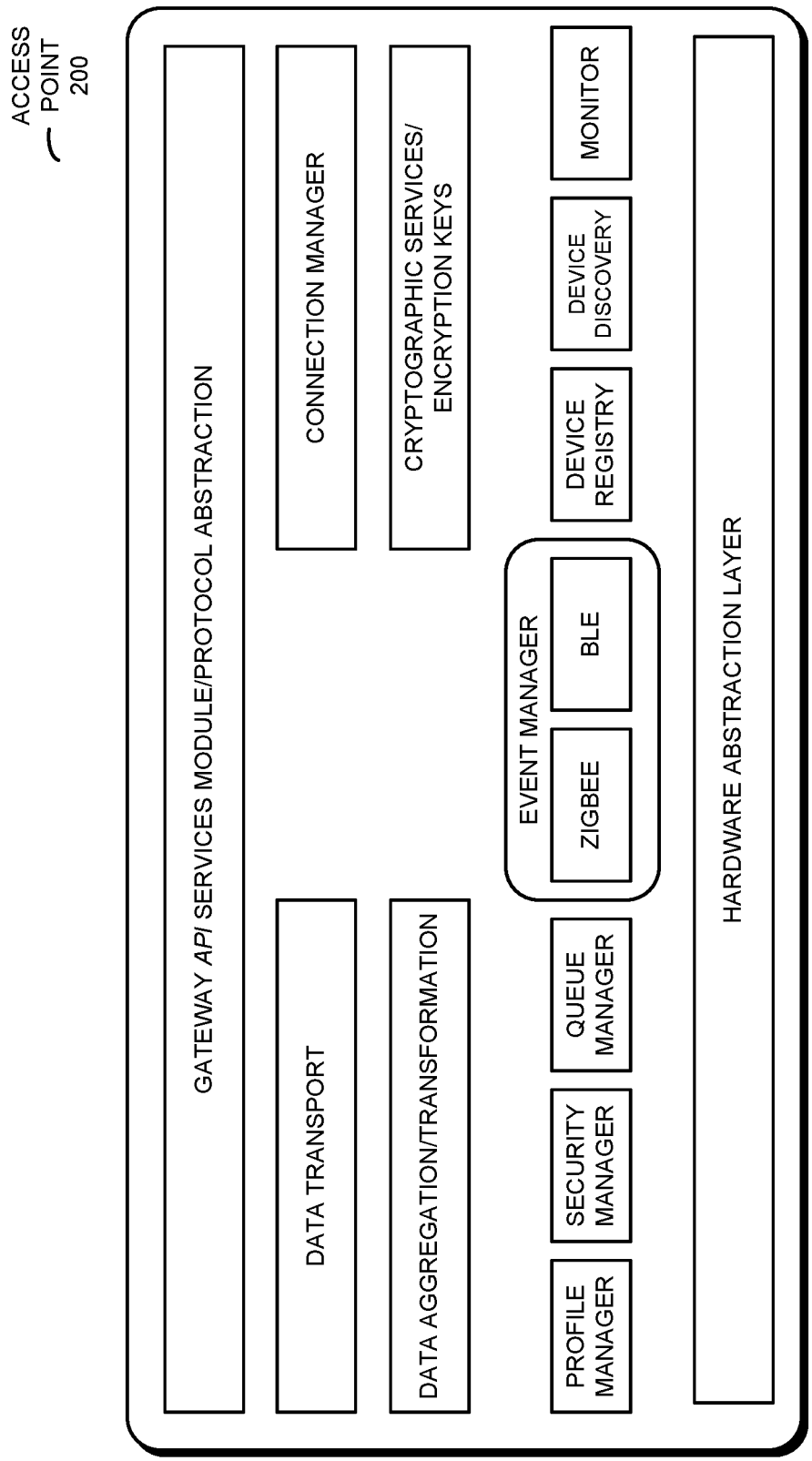
FIG. 2 is a drawing illustrating an example of functionality of an access point in FIG. 1 in accordance with an embodiment of the present disclosure.

FIG. 2 presents a drawing illustrating an example of functionality of an access point 200, such as access point 110-1 in FIG. 1. Access point 200 may include an embedded IoT gateway and may provide an IoT-device management platform that is programmable and that can be easily integrated with existing management solutions. The core gateway functions in access point 200 may include: different communication-protocol stacks, a hardware for communication-protocol abstraction (which can provide a unified view of IoT devices to management platform), data acquisition (such as data aggregation and transformation), prioritization (data/traffic prioritization), management (which can access and set an electronic-device configuration), security (secure electronic-device authentication/actuation and cryptographic services, such as storing one or more encryption keys associated with particular electronic devices), data transport (such as MQTT), a connection manager and/or a gateway API services module and communication-protocol abstraction. In addition, access point 200 may include: an event manager core application (for different communication protocols, such as ZigBee or BLE), a profile manager for the different communication protocols, a security manager, a queue manager, an electronic-device registry, electronic-device discovery and/or a monitor that ensures safe and appropriate operation (such as by detecting an anomaly), and that tracks communication performance, etc.

In some embodiments, access point 200 may include a trusted secure element, WLAN firmware, an IoT gateway engine or control logic (such as one or more physical layer communication protocols) and an application layer that translates between different communication protocols. Note that a given access point may provide at least one communication protocol (in addition to Wi-Fi) via a USB dongle, and groups of access points may be interleaved to provide multiple different communication protocols.

After receiving information (such as IoT-device data or data traffic) from one or more of electronic devices 112 in FIG. 1, access point 200 may translate, into a unified format, the information associated with the one or more electronic devices 112, which may have been received by access point 200, at an interface circuit in access point 200, using different communication protocols. Then, access point 200 may send or communicate the translated information in a unified and consistent manner to a services manager, such as services manager 114 (FIG. 1). For example, access point 200 may provide, from an interface circuit in access point 200, the translated information for one or more additional electronic devices (such as services manager 114 in FIG. 1) using another communication protocol, such as MQTT.

In some embodiments, access point 200 (or services manager 114 in FIG. 1) may provide security by selectively including communication with an electronic device (such as electronic device 112-1 in FIG. 1) in an inclusion list and/or by selectively excluding communication with another electronic devices (such as electronic device 112-2 in FIG. 1) in an exclusion list. For example, the black and/or white lists may be applied by access point 200 following a scan.

Figure 3:
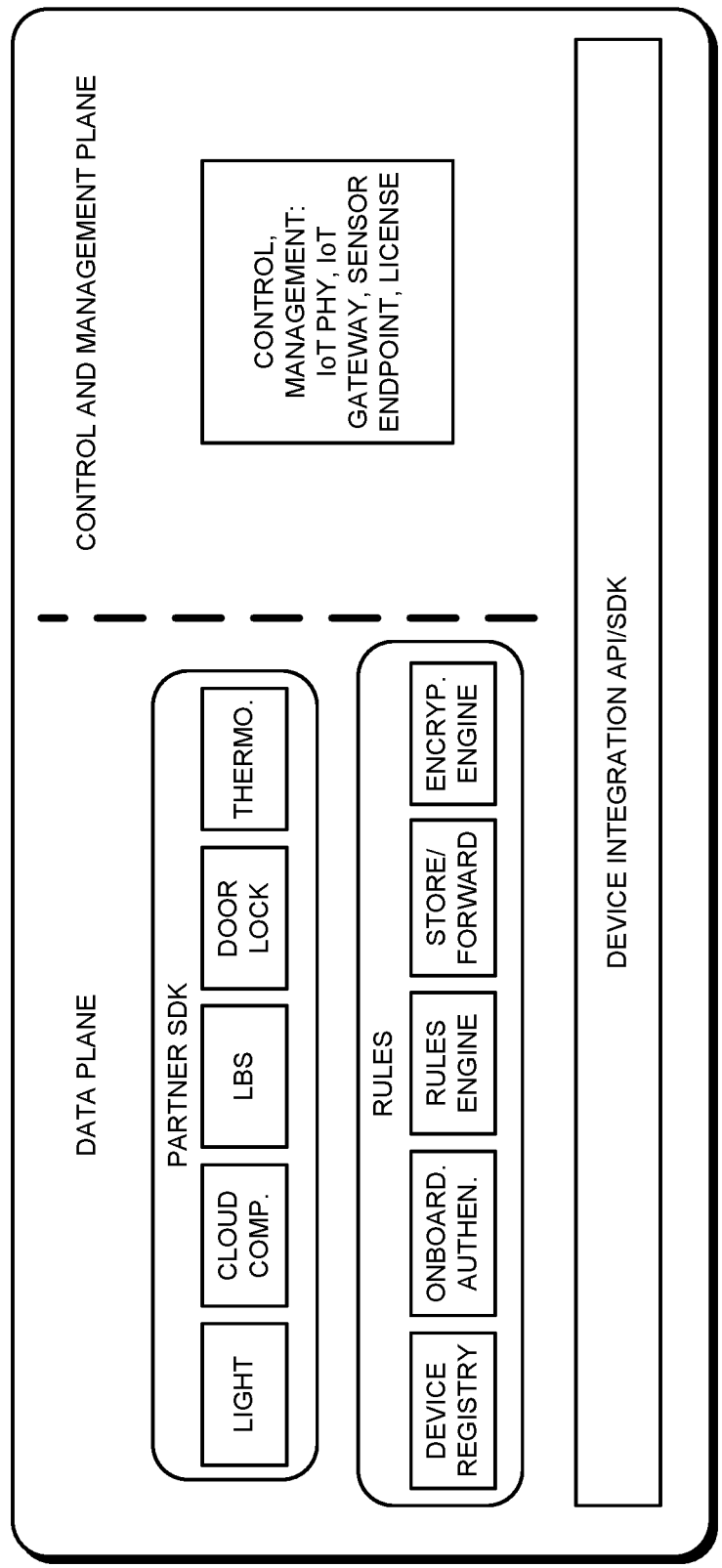
FIG. 3 is a block diagram illustrating an example of an Internet-of-Things (IoT) services manager of FIG. 1 in accordance with an embodiment of the present disclosure.
Figure 4:
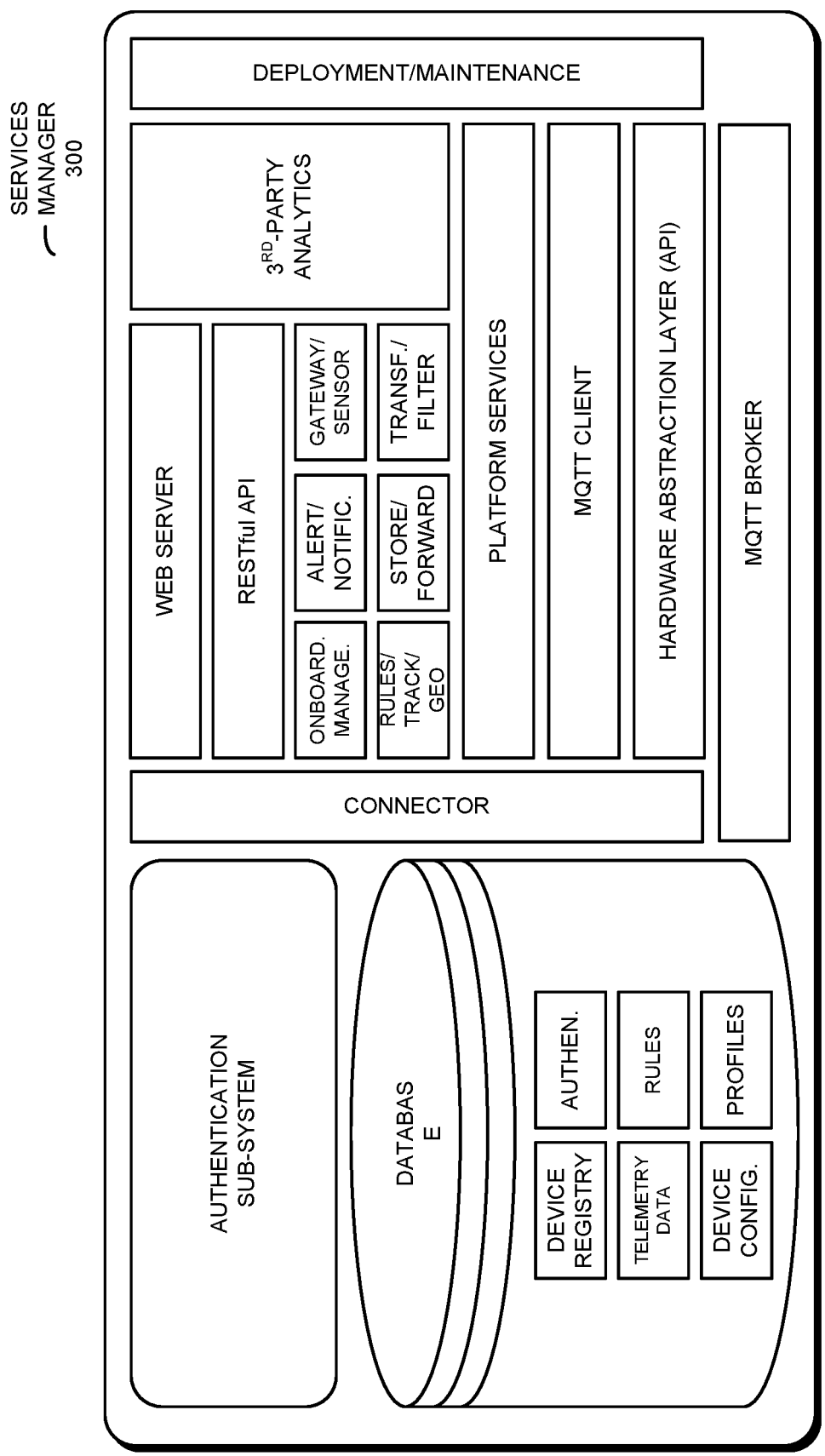
FIG. 4 is a block diagram illustrating an example of a software architecture of the services manager of FIGS. 1 and 3 in accordance with an embodiment of the present disclosure.

FIG. 3 presents a block diagram illustrating an example of a Virtual Internet-of-Things (VIoT) services manager 300, such as services manager 114 in FIG. 1. This services manager may include: a gateway that communicates with one or more access points 110 (FIG. 1) via a communication protocol (such as MQTT); a control and management plane with system-configuration information; and a data plane with a registry of the one or more of electronic devices 112 (FIG. 1), rules for the one or more of electronic devices 112, and APIs for service providers. Services manager 300 may provide a programmable, modular and integrated system for flexibly and securely exchanging data and associated services among access points 110, electronic devices 112, services manager 114 or 300, computers 116 and/or computer 130 in FIG. 1. Moreover, resources in services manager 300 that are associated with different service providers may be contained in separate virtual machines. Alternatively or additionally, the resources from different service providers may be included in 'containers,' such as Docker containers. Note that a container may be a lightweight, stand-alone, executable package of a piece of software that includes everything needed to run it: code, runtime, system tools, system libraries, and settings. The containerized software may run the same, regardless of the environment. Containers also may isolate software from its surroundings, such as differences between development and staging environments, and may help reduce conflicts between different software that is running on the same infrastructure.

As noted previously, services manager 300 may include a control and management plane. The control and management plane may include: control management, an IoT physical layer, a gateway (such as a gateway engine, control logic or module), an IoT-device endpoint, and/or associated licenses. In addition, the control and management plane may provide system-architecture configuration, such as: transmit power, Internet Protocol (IP) addresses, etc.

Moreover, services manager 300 may include a data plane with a partner SDK (for applications/services such as: a door lock, a thermostat, a light, analytical services, location-based services or LBS, cloud-based computing, etc.). Furthermore, the data plane may include rules, such as: an electronic-device registry (which may include device-specific information in device profiles), a rules engine or module, onboarding, authentication, an encryption engine or control logic, and store and forward.

Services manager 300 may be a dual-stack, open-programmable, virtualized IoT device-management gateway platform. It may be highly customizable, deployable in multiple network topologies, and may be integrated with existing management networks. The dual-stack, open-programmable, virtualized IoT device-management gateway platform may be an enterprise-grade IoT device-management platform. Note that services manager 300 may be a policy-driven virtualized wireless gateway that manages an IoT device network that includes one or more types of IoT devices from one or more manufacturers, and which may use different communication protocols. The open framework may facilitate IoT-device management in separate virtual machines, which may offer different services.

In some embodiments, access point 200 (FIG. 2) and/or services manager 300 addresses a typical IoT device-network management system, which may include: wireless IoT devices, a physical communication layer, a network connectivity/protocol layer, and/or a gateway layer. Notably, access point 200 (FIG. 2) may include a data acquisition layer. For example, a data acquisition engine or control logic may enable gateway communication at scale with many IoT devices using disparate IoT-device connectivity or communication protocols (such as BLE, ZigBee, Z-Wave, etc.). This data acquisition layer may include the drivers and metadata information used to recognize and communicate with the different IoT-device types using different communication protocols.

Moreover, access point 200 (FIG. 2) may include an aggregation and translation layer. Notably, many of the IoT-device connectivity or communication protocols are rudimentary and fragmented. For example, ZigBee or BLE often does not provide support for Internet Protocol communication. The aggregation and translation layer may perform the function of normalizing the data collected across these IoT devices. This block may perform packet processing and encapsulation functions for disparate incoming IoT-device packets and the output of this block may be normalized data in a standard format (such as MQTT) that is recognizable by a programmable application layer.

Furthermore, services manager 300 may include a programmable application layer. Notably, a smart-gateway abstraction service in services manager 300 may provide a full edge analysis engine or module. For example, the programmable application layer may implement blocks and functions, such as: a message broker, a rules engine or module, an onboarding engine or module, an electronic-device registry, a store and forward engine or module, and/or an encryption engine of control logic. Note that this layer may host a runtime environment and/or one or more libraries that enable third-party IoT SDKs, such as the partner service-provider SDKs. The routing of data packets to different third-parties may be based at least in part on predefined policies specified by a user, such as a customer or a service-provider partner.

Additionally, services manager 300 may include an open management interface layer.

Services manager 300 may be a self-contained virtual machine that includes APIs that enable customers and/or service-provider partners to add another layer of contextualization/customization based at least in part on specific business needs. This flexibility may make services manager 300 highly programmable and rapidly deployable.

Note that services manager 300 may be architected as a dual-stack gateway. A first stack may include the data acquisition layer and the aggregation and translation layer. As discussed previously, the first stack may physically reside in a wireless access point (such as access point 200 in FIG. 2) and/or in on-premise gateway hardware.

A second stack may include the programmable application layer and the open management interface layer. Note that the second stack is a virtual machine that can reside on any of the wireless gateway hardware, such as access point 200 (FIG. 2), controller 124 (FIG. 1), services manager 300. Thus, the second stack may be on-premise, in a data center or may be cloud-based. Therefore, in general functionality of access point 200 (FIG. 2) and/or services manager 300 may be implemented by an arbitrary component, such as a local or a distributed electronic device or system.

The dual-stack architecture may provide flexibility to be deployed in an arbitrary network topology. In addition, this architecture may enable a distributed gateway architecture.

The core functions of the solution (which is sometimes referred to as an 'IoT gateway') implemented in access point 200 (FIG. 2) and services manager 300 may include: centralized management (secure onboarding management of IoT devices and gateways), data aggregation (aggregate and transform data from multiple gateways), edge analytics (process data at the edge, i.e., behind the firewall, from multiple gateways), hardware abstraction (provide unified view/management of different IoT-device types), and/or rules and alerts (create rules and alerts, predictive analysis, etc.).

The technology and capabilities of the solution implemented in access point 200 (FIG. 2) and services manager 300 may include: self-contained container/virtual machine that can be hosted anywhere (such as a controller, a switch, in the cloud, etc.). Moreover, the solution may have multi-tenants, which provides flexible deployment models and allows the use of a public and/or a private cloud. Furthermore, the solution may have the ability to host $3^{rd}$-party SDKs and may provide a unified view of IoT devices/gateways. Additionally, the solution may incorporate edge computing capabilities (e.g., via a partner SDK and/or internal capability). The solution may be highly modular with a cloud-scale architecture.

In some embodiments, an open, programmable IoT gateway module may be programmed through a multitude of management platforms using one or more interfaces. Moreover, the IoT gateway may be capable of machine learning and intelligent decision making at the edge without backhauling information to the cloud, e.g., intelligent channel selection and assignment of channels across disparate wireless radios (such as ZigBee, Bluetooth, BLE, Wi-Fi, LoRaWAN, etc.). Furthermore, the IoT gateway may automatically detect anomalies and may dynamically use rules for creation/insertion to suppress anomalies. In addition, the IoT gateway may provide notifications, intelligent tracking and geo fencing of IoT and IoT-device assets. Additionally, the IoT gateway may intelligently identify and classify electronic devices, e.g., learning electronic-device characteristics based at least in part on communication patterns, association patterns, and/or beaconing patterns. These characteristics may be used to assign traffic from an electronic device to a queue with an appropriate queue latency. The IoT gateway may also prioritize electronic devices and/or electronic-device categories based at least in part on the learned characteristics, which may be used to prioritize messages and/or message categories. In some embodiments, the IoT gateway may guarantee delivery of certain IoT messages based, e.g., at least in part on prioritization, intelligent classification and/or machine learning FIG. 4 presents a block diagram illustrating an example of a software architecture of services manager 300. Notably, services manager 300 may include: an MQTT broker, a hardware abstraction layer API, an MQTT client, VIoT platform services (such as Java/Python runtime platform services), a gateway/IoT-device onboarding management, alerts/notifications, gateway/IoT-device actions, a rules engine/tracking/geo fencing, store and forward, and/or data transformation and filter. In addition, services manager 300 may include: $3^{rd}$-party edge analytics, a RESTful API (which uses HTTP requests to GET, PUT, POST and DELETE data) for provisioning, actuation, statistics aggregation and management, a web server, an authentication subsystem, and/or a database. The $3^{rd}$-party edge analytics may interface to external analytics services, the Web server may interface to one or more external cloud-based components, partner management portals, dashboard services and/or mobile applications. Note that the database may include information, such as: an electronic-device registry, telemetry data, electronic-device configuration, authentication, rules and/or profiles (e.g., electronic-device characteristics or device-specific information). In some embodiments, services manager 300 supports blockchain for highly secure environments.

Figure 5:
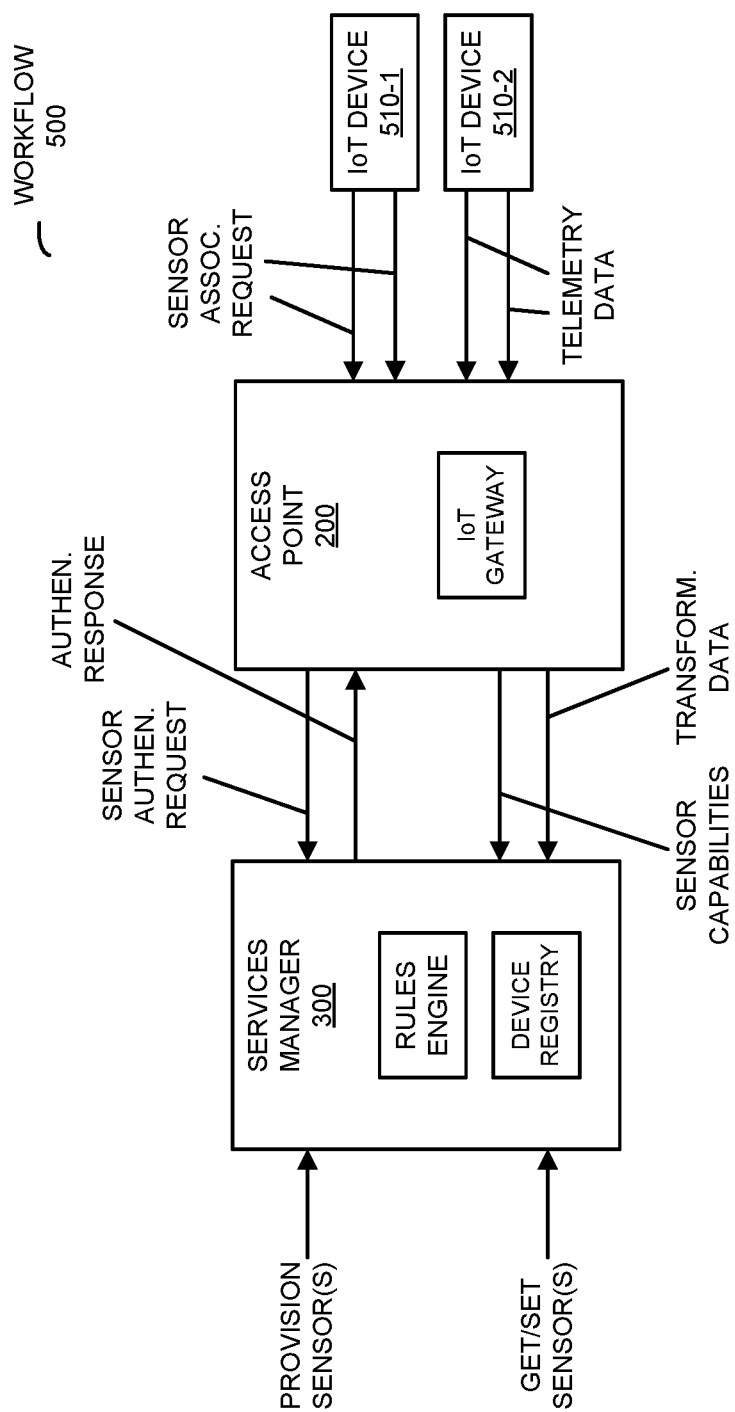
FIG. 5 is a drawing illustrating an example of an onboarding work flow in accordance with an embodiment of the present disclosure.

FIG. 5 presents a drawing illustrating an example of an onboarding work flow 500. Notably, IoT devices may be provisioned via an API call. Then, services manager 300 may create entry in an electronic-device registry. Moreover, one or more of IoT devices 510 may provide an IoT-device associate request to a gateway in access point 200. In response, access point 200 may provide an IoT-device authorization request to services manager 300, and may receive an authorization response. Next, access point 200 may provide information about IoT-device capabilities (and, more generally, characteristics of IoT devices 510). Furthermore, services manager 300 may receive an API call to get or set IoT devices, which may be forwarded to one or more of IoT devices 510. In response, one or more of IoT devices 510 (such as IoT device 510-2) may provide telemetry data. Associated transformed data may be provided by access point 200 to services manager 300. Additionally, services manager 300 may process the transformed data and/or may trigger local rules.

Figure 6:
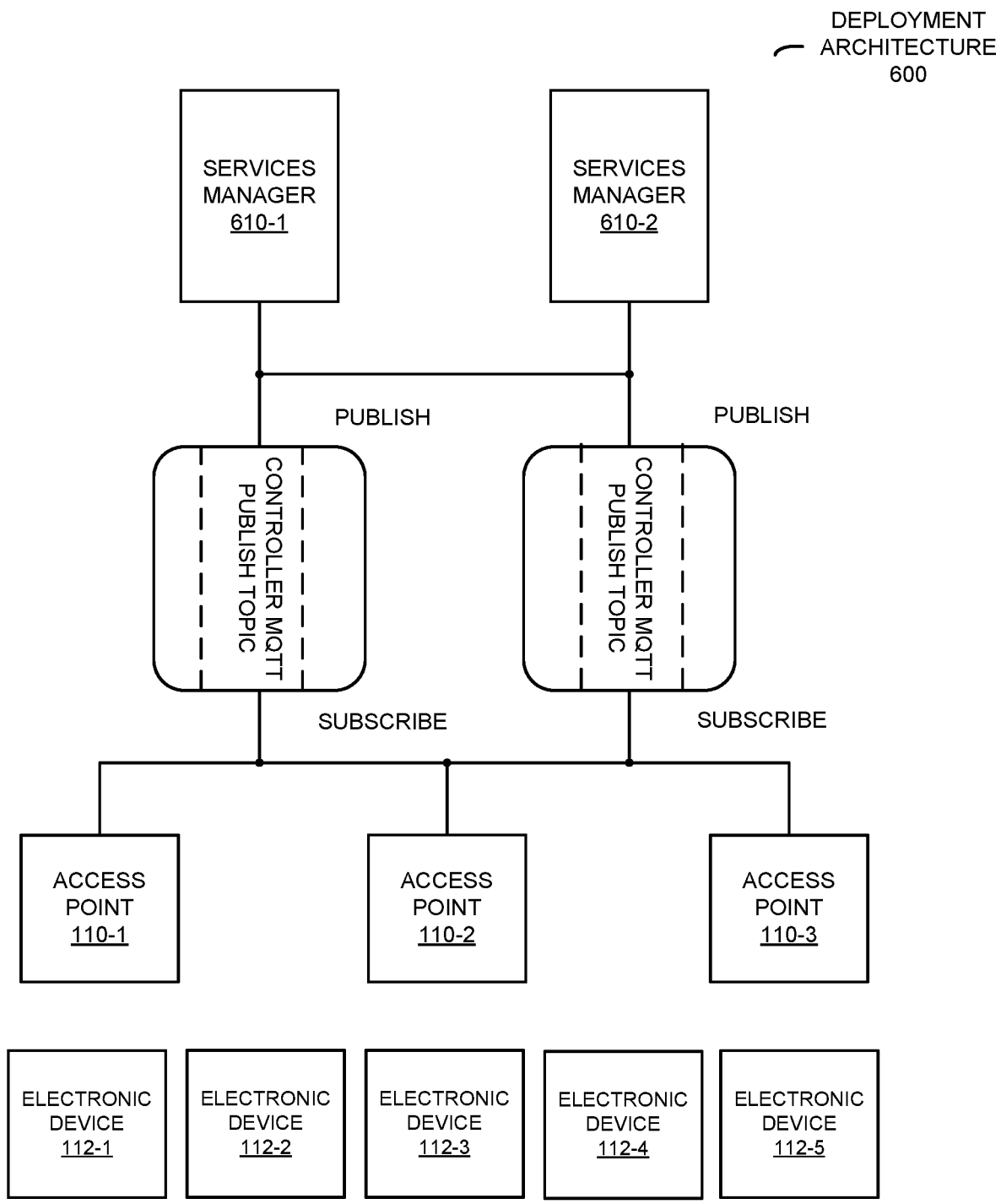
FIG. 6 is a drawing illustrating an example of a deployment architecture in accordance with an embodiment of the present disclosure.

FIG. 6 presents a drawing illustrating an example of a deployment architecture 600. This architecture may include: one or more IoT devices or electronic devices 112 (which may include one or more sensors or sensing capabilities), one or more access points 110 (or gateways), and one or more services managers 610. Services managers 610 may publish or subscribe messages via controller MQTT publish topics. For example, services managers 610 may publish or subscribe messages using channels (which may be static or dynamic) having associated priorities.

Note that a given services manager (such as services manager 610-1) may dynamically configure subdomains in access points 110 and/or electronic devices 112 (FIG. 1) to define a range of communication using a communication protocol, such as MQTT. Alternatively or additionally, the given services manager may dynamically define channels for data traffic with access points 110 and/or electronic devices 112, where the channels are associated with different topics.

While the preceding embodiments illustrate access points 110 and services manager 114 as having particular components and a particular architecture, other embodiments may include fewer or more components, different components and/or a different architecture.

We now describe embodiments of methods associated with the communication techniques. In principle, bootstrapping based on a shared secret can be used to provision additional keys to electronic devices to facilitate secure communication, e.g., in a link that uses a communication protocol, such as ZigBee. For example, the electronic devices may be pre-programmed with the shared secret.

However, this approach is often inflexible. For example, the shared secret typically cannot be changed. In addition, because the shared secret is stored in the electronic devices, it can be difficult to prevent a malicious actor from gaining access to the shared secret. Consequently, pre-programming the electronic devices with the shared secret usually does not provide a secure solution for provisioning the electronic devices.

Figure 7:
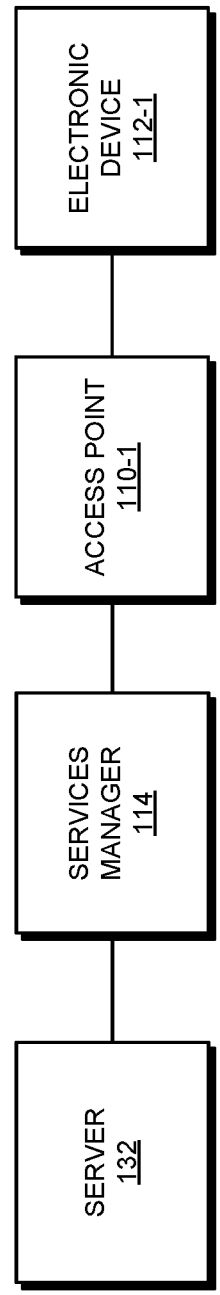
FIG. 7 is a drawing illustrating an example of secure distribution of a link key in accordance with an embodiment of the present disclosure.

In order to address this problem, embodiments of the communication techniques may be used. This is illustrated in FIG. 7, which presents a drawing illustrating an example of secure distribution of a link key in accordance with an embodiment of the present disclosure. Notably, during the communication techniques, while an administrator is logged into services manager 114, server 132 may upload a link key to services manager 114 using a secure widget, where the link key facilitates secure communication, such as encrypted communication (e.g., using a secure socket layer or SSL), via a link (such as a link that uses a ZigBee communication protocol). Then, services manager 114 may create an access key (which is sometimes referred to as a 'keyring key'), and may generate an encrypted version of the link key (which is sometimes referred to as a 'keyring') based at least in part on the access key and the link key, where the access key enables access to the link key based at least in part on the encrypted version of the link key. For example, the access key may be used to encrypt the link key, and thus enables or can be used to decrypt the encrypted version of the link key. Note that the access key may be created based at least in part on an administrator login credential (such as a password). In some embodiments, the access key may be a random or a pseudorandom number. Moreover, the access key may be created based at least in part on a policy or privilege associated with the administrator.

Next, services manager 114 may store the link key, the access key and/or the encrypted version of the link key in a trusted envelope or partition in memory in services manager 114 with encryption. In some embodiments, metadata may be stored with the link key, the access key and/or the encrypted version of the link key in the trusted envelope. This metadata may specify when the access key was created and how long it is valid or when the access key expires. Moreover, when the administrator logs out, services manager 114 may disable access to the trusted envelope.

Subsequently, when the administrator logs in to services manager 114 again, services manager 114 may re-enable access to the trusted envelope. Then, when the services manager 114 receives information that indicates that a gateway (such as access point 110-1) has joined a network (such as a WLAN), services manager 114 may provide the encrypted version of the link key to access point 110-1. For example, services manager 114 may detect access point 110-1 in the network. Alternatively, the administrator may provide to services manager 114 information indicating that access point 110-1 joined the network. Note that access point 110-1 may be preauthorized to work with services manager 114, e.g., services manager 114 may store a gateway identifier of access point 110-1 (such as a gateway MAC address or a Serial number) that is used to authorize access point 110-1.

Moreover, electronic device 112-1 may associate with access point 110-1 (i.e., a connection may be established between access point 110-1 and electronic device 112-1), such as during an installation process (e.g., of an electronic lock). In response, access point 110-1 may provide an access request for the access key to services manager 114. This access request may include an identifier of electronic device 112-1. Next, in response to the access request, services manager 114 may provide the access key to access point 110-1. Note that the providing of the access key to access point 110-1 may be further based at least in part on the identifier (such as whether the identifier is included in a predefined list of electronic devices that are allowed to receive the access key) and/or authorization from the administrator (which may be provided based at least in part on out-of-band communication between an installer of electronic device 112-1 and the administrator). In some embodiments, the encrypted version of the link key and the access key may be provided using different communication channels, different bands of frequencies and/or different communication techniques.

After receiving the access key, access point 110-1 may optionally provide the access key to electronic device 112-1. Furthermore, access point 110-1 may access the link key based at least in part on the encrypted version of the link key and the access key, and may install the link key in an interface circuit in access point 110-1 (such as in a radio). Additionally, access point 110-1 may discard or erase the access key from memory in access point 110-1.

Moreover, during the installation process, electronic device 112-1 may receive the encrypted version of the link key from the installer or a vendor or manufacturer of electronic device 112-1. For example, the installer may provide the encrypted version of the link key to electronic device 112-1 via a wired connection. Thus, when electronic device 112-1 receives the access key, electronic device 112-1 may access the link key based at least in part on the encrypted version of the link key and the access key (e.g., by de-encrypting the encrypted version of the link key), and may install the link key in an interface circuit in electronic device 112-1 (such as in a radio). Then, electronic device 112-1 may discard or erase the access key from memory in electronic device 112-1. Alternatively, electronic device 112-1 may receive the link key from the installer or the vendor (and, thus, may not need the access key). In this way, the link between access point 110-1 and electronic device 112-1 may be provisioned with the link key for secure communication.

After the administrator logs out of services manager 114 again, services manager 114 may disable access to the trusted envelope. Thus, the trusted envelope may only be accessible when the administrator is logged in. This may ensure that the stored sensitive information (such as the link key, the access key and/or the encrypted version of the link key) are only accessible during brief time intervals.

Figure 8:
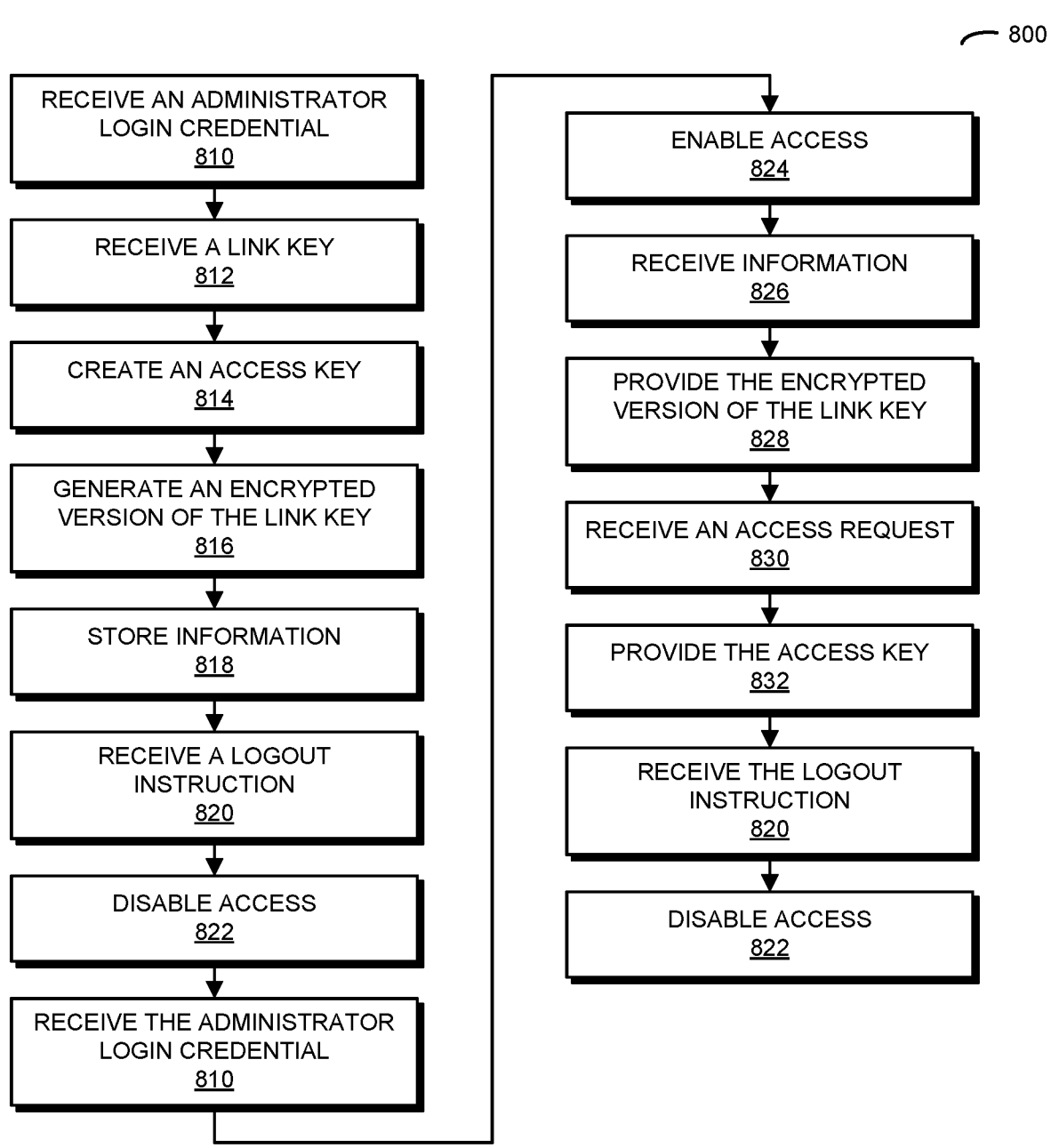
FIG. 8 is a flow diagram illustrating an example of a method for distributing a link key in accordance with an embodiment of the present disclosure.

FIG. 8 presents a flow diagram illustrating an example of a method 800 for distributing a link key in accordance with an embodiment of the present disclosure, which may be performed by an electronic device, such as services manager 114 in FIG. 1. During operation, the electronic device may receive an administrator login credential (operation 810). While the administrator is logged in, the electronic device may receive a link key (operation 812), e.g., using a secure widget, where the link key facilitates secure communication via a link. Note that the link may be associated with a ZigBee communication protocol.

Then, the electronic device may create an access key (operation 814), and may generate an encrypted version of the link key (operation 816) based at least in part on the access key and the link key, where the access key enables access to the link key based at least in part on the encrypted version of the link key. Moreover, the access key may be created based at least in part on the administrator login credential (such as a password). For example, the access key may be a random or a pseudorandom number. In some embodiments, the access key is created based at least in part on a policy or privilege associated with the administrator.

Next, the electronic device may store information (operation 818), such as the link key, the access key and/or the encrypted version of the link key in a trusted envelope or partition in memory in the electronic device with encryption. Note that metadata may be stored with the link key, the access key and/or the encrypted version of the link key in the trusted envelope. This metadata may specify when the access key was created and how long it is valid or when the access key expires.

Moreover, when the electronic device receives a logout instruction for the administrator (operation 820), the electronic device may disable access (operation 822) to the trusted envelope.

Furthermore, when the electronic device subsequently receives the administrator login credential (operation 810), the electronic device may re-enable access (operation 824) to the trusted envelope. Then, when the electronic device receives information (operation 826) that indicates that a gateway has joined a network, the electronic device may provide the encrypted version of the link key (operation 828) to the gateway. Note that the gateway may include an access point or an eNodeB.

Moreover, when the electronic device receives, associated with the gateway, an access request (operation 830) for the access key, the electronic device may provide the access key (operation 832) to the gateway. Note that the encrypted version of the link key and the access key may be provided using different communication channels. Additionally, note that the access request may be associated with a second electronic device that is associated with the gateway. In some embodiments, the electronic device provides the access key based at least in part on the access request, authorization associated with the administrator and/or an identifier of the second electronic device. For example, the electronic device may receive the authorization associated with the administrator prior to providing the access key and/or the identifier may be included in the access request.

Furthermore, when the electronic device receives the logout instruction for the administrator (operation 820), the electronic device may disable access (operation 822) to the trusted envelope.

Figure 9:
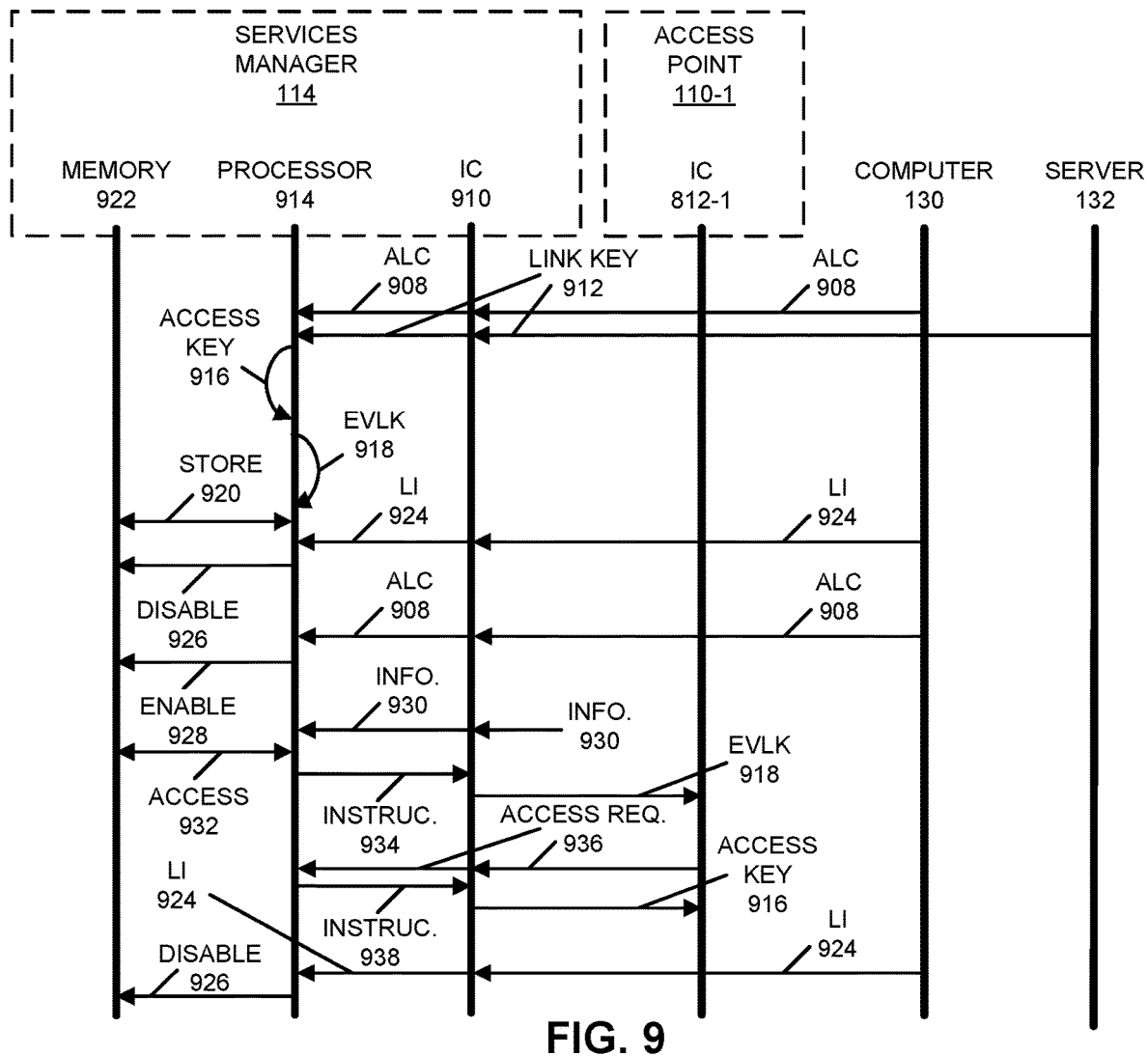
FIG. 9 is a drawing illustrating an example of communication among the electronic devices in FIG. 1 in accordance with an embodiment of the present disclosure.

Embodiments of the communication techniques are further illustrated in FIG. 9, which presents a drawing illustrating an example of communication among services manager 114, access point 110-1, computer 130 and server 132 in accordance with an embodiment of the present disclosure. Notably, an administrator may use computer 130 to login to services manager 114, e.g., by providing an administrator login credential (ALC) 908 to interface circuit (IC) 910 in services manager 114, which is provided to processor 914 in services manager 114.

Then, interface circuit 910 may receive a link key 912 from server 132 while an administrator is logged in to services manager 114. This link key may be provided to processor 914.

Moreover, processor 914 may create an access key 916, e.g., based at least in part on the administrator login credential 908, and may generate an encrypted version of the link key (EVLK) 918 based at least in part on access key 916 and link key 912. Next, processor 914 may store 920 link key 912, access key 916 and/or the encrypted version of the link key 918 in a trusted envelope or partition in memory 922 in services manager 114 with encryption.

Subsequently, when the administrator provides a logout instruction (LI) 924 from computer 130 to interface circuit 910, which provides this information to processor 914, processor 914 may disable access 926 to the trusted envelope in memory 922.

Moreover, when the administrator subsequently logs in again to services manager 114 (e.g., by using computer 130 to provide the administrator login credential 908 to interface circuit 910 in services manager 114, which is provided to processor 914, processor 914 may re-enable access 928 to the trusted envelope in memory 922. Then, when interface circuit 910 receives information 930 that indicates that access point 110-1 has joined a network, which is provided to processor 914, processor 914 may access 932 information (such as access key 916 and/or the encrypted version of the link key 918) in memory 922 and may instruct 934 interface circuit 910 to provide the encrypted version of the link key 918 to access point 110-1.

Furthermore, when interface circuit 910 receives an access request 936 from access point 110-1 for access key 916, which is provided to processor 914, processor 914 may instruct 938 interface circuit 910 to provide access key 916 to access point 110-1

Additionally, when the administrator provides logout instruction 924 from computer 130 to interface circuit 910, which provides this information to processor 914, processor 914 may disable access 926 to the trusted envelope in memory 922.

Figure 10:
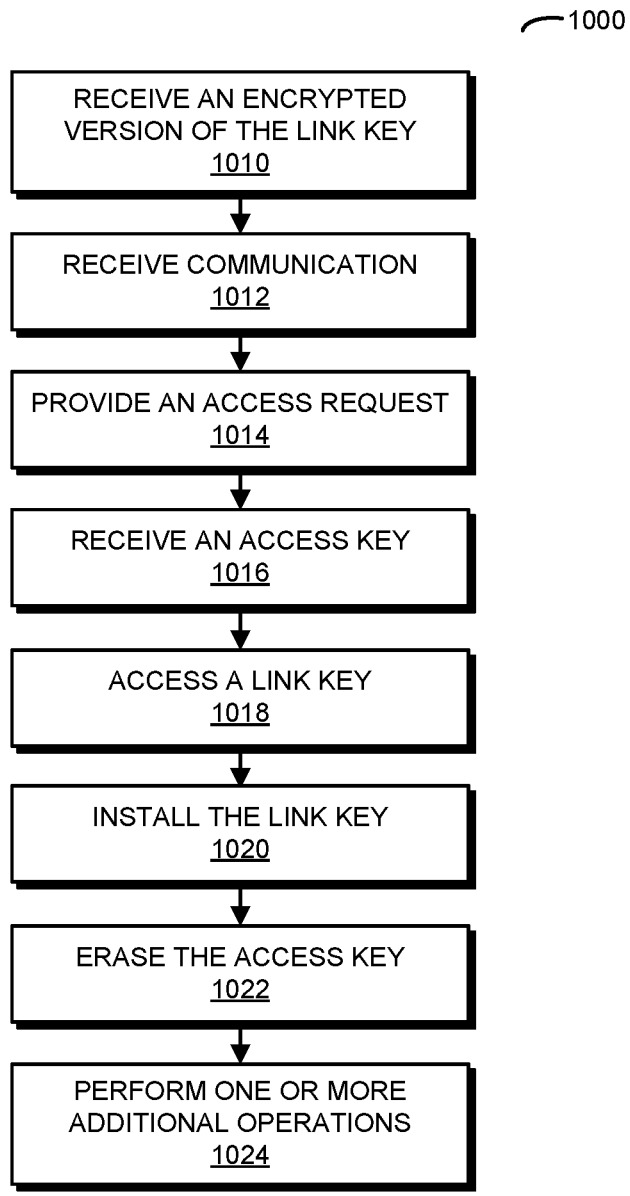
FIG. 10 is a drawing illustrating an example of a method for distributing an access key for a link key in accordance with an embodiment of the present disclosure.

FIG. 10 presents a drawing illustrating an example of a method 1000 for distributing an access key for a link key in accordance with an embodiment of the present disclosure, which may be performed by a gateway, such as access point 110-1 in FIG. 1 or an eNodeB. During operation, the gateway may receive an encrypted version of the link key (operation 1010) from an electronic device, where the link key facilitates secure communication via a link. For example, the link may be associated with or may use a ZigBee communication protocol.

Then, the gateway may receive a communication (operation 1012) associated with a second electronic device. For example, the communication may occur during establishing of an association between the gateway and the second electronic device. Moreover, the gateway may provide an access request for the access key (operation 1014) addressed to the electronic device, where the access key enables access to the link key based at least in part on the encrypted version of the link key. Next, the gateway may receive the access key (operation 1016) from the electronic device. Note that the encrypted version of the link key and the access key may be received using different communication channels. Furthermore, note that the request and/or the access request may include an identifier of the second electronic device (such as a Serial number or a MAC address of the second electronic device).

Furthermore, the gateway may access the link key (operation 1018) based at least in part on the encrypted version of the link key and the access key, and may install the link key (operation 1020) in an interface circuit in the gateway. Additionally, the gateway may discard or erase the access key (operation 1022) from memory in the gateway.

In some embodiments, the gateway performs one or more optional additional operations (operation 1024). For example, the gateway may optionally provide the access key to the second electronic device.

In some embodiments of method 800 (FIG. 8) and/or 1000 there may be additional or fewer operations. Furthermore, the order of the operations may be changed, and/or two or more operations may be combined into a single operation.

For example, in method 800, instead of creating the access key (operation 814) and/or generating the encrypted version of the link key (operation 816), the electronic device may obtain the access key and/or the encrypted version of the link key. For example, the electronic device may access the access key and/or the encrypted version of the link key in memory. Alternatively, the electronic device may receive the access key and/or the encrypted version of the link key from another electronic device or computer.

In this way, the communication techniques may facilitate provisioning of the link key to the gateway and the second electronic. Thus, the communication techniques may improve communication performance of, e.g., ZigBee in IoT applications.

Figure 11:
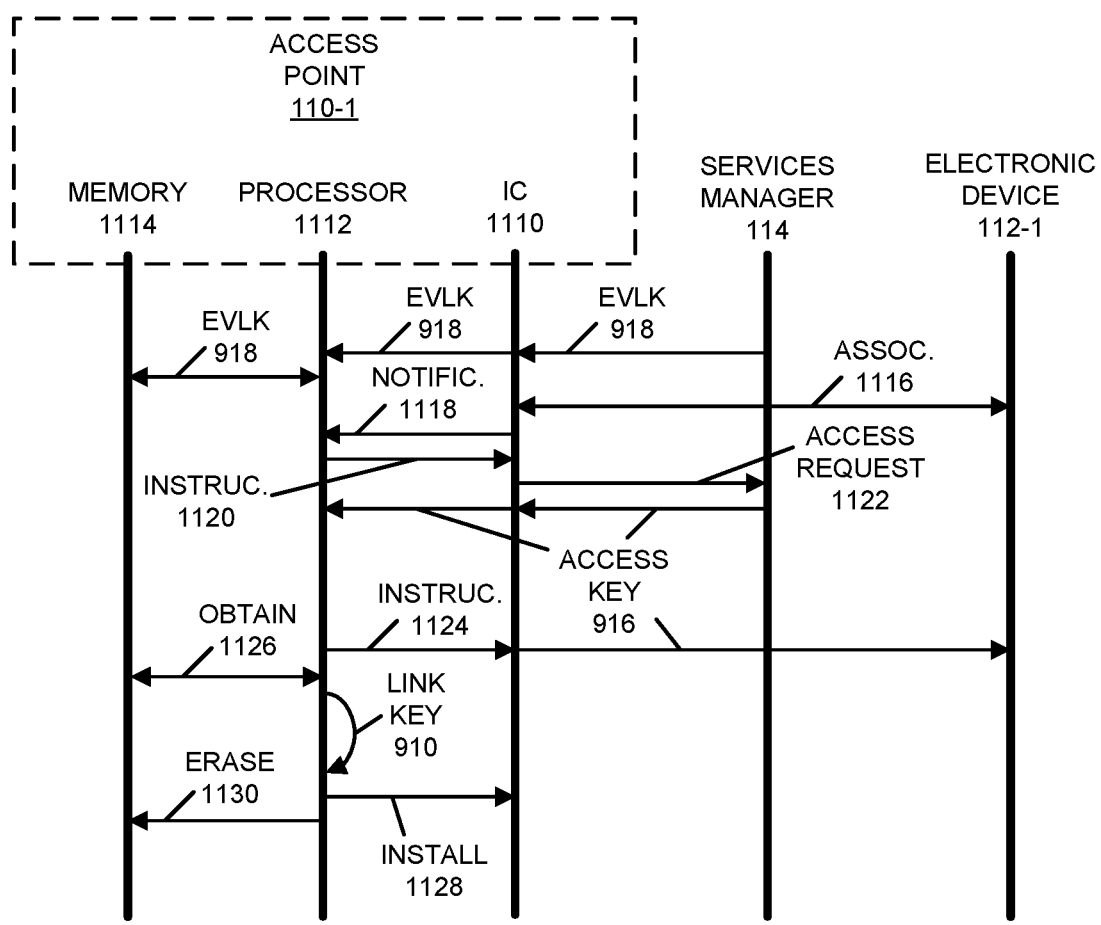
FIG. 11 is a drawing illustrating an example of communication among the electronic devices in FIG. 1 in accordance with an embodiment of the present disclosure.

Embodiments of the communication techniques are further illustrated in FIG. 11, which presents a drawing illustrating an example of communication among services manager 114, access point 110-1 and electronic device 112-1 in accordance with an embodiment of the present disclosure. Notably, services manager 114 may provide the encrypted version of a link key 918 to interface circuit 1110 in access point 110-1. Then, interface circuit 1110 may provide the encrypted version of the link key 918 to processor 1112 in access point 110-1, which stores the encrypted version of the link key 918 in memory 1114 in access point 110-1.

Next, electronic device 112-1 may associate 1116 with access point 110-1 via interface circuit 1110. After association 1116, interface circuit 1110 may notify 1118 processor 1112. In response, processor 1112 may instruct 1120 interface circuit 1110 to provide an access request 1122 to services manager 114 for access key 916.

Moreover, in response to access request 1122, services manager 114 may provide access key 916 to access point 110-1. After receiving access key 916, interface circuit 1110 may provide access key 916 to processor 1112.

Furthermore, processor 1112 may optionally instruct 1124 interface circuit 1110 to provide access key 916 to electronic device 112-1. Additionally, processor 1112 may obtain 1126 the encrypted version of the link key 918 in memory 1114, and may use access key 916 to decrypt link key 912. Then, processor 1112 may install 1128 link key 912 in interface circuit 1110 in access point 110-1. Next, processor 1112 may erase 1130 the encrypted version of the link key 918, access key 916 and/or link key 914 in memory 1114.

While FIGS. 9 and 11 illustrate communication between components using unidirectional or bidirectional communication with lines having single arrows or double arrows, in general the communication in a given operation in these figures may involve unidirectional or bidirectional communication.

It can be difficult to initialize secure communication with many communication protocols (such as ZigBee 2.0) that are used in IoT applications. This is because, often, there is not a key distribution technique for bootstrapping link security. For example, in ZigBee 2.0, the initial link key (which is typically stored in a local trust device or center for an electronic device) may present a security risk. Recent attempts to address this problem (such as with an off-link install code that is manually entered or provisioned for a specific link or IoT personal area network or PAN) are often cumbersome and expensive, and may not scale well to large numbers of electronic devices. Moreover, legacy electronic devices, which do not use these new approaches, may still pose a security risk.

In the disclosed communication techniques, link keys may be managed and provisioned. These approaches may be scalable to thousands of PAN networks and tens of thousands of electronic devices. Moreover, the communication techniques may use distribution that does not require hardened trust devices or centers (which are expensive and difficult to configure) in thousands of gateways that each provide the initial link key for each electronic device in each PAN network.

In the communication techniques, an IoT controller or services manager is used to provide a hardened link key or a set of link keys in a large deployment, and then to manage them so that gateways may not need to maintain the link keys locally using a trusted device or controller. The IoT controller may have one hardened device, e.g., a USB device mapped to a virtual IoT controller. This hardware may include a trusted device that contains a crypto-boundary (which is sometimes referred to as a 'trust envelope' or 'trust zone') inside which a common initial link key or a group of link keys can be stored and securely retrieved via a trusted interface. Note that per-PAN or common access keys may be stored and retrieved in the trusted device in a similar manner.

Moreover, in the communication techniques, the initial link keys may be used in time-limited encrypted versions of the link key(s) that are distributed via secure channel(s) (such as mutually authenticated MQTT over SSL channel) to each IoT gateway that store the actual link keys. For example, the IoT controller may generate and store (in the trusted device) access keys having expiration times. Moreover, the secure channel(s) between the IoT controller and IoT gateways allows propagation of the encrypted version(s) of the link key(s) to the gateways and the distribution of the access keys.

Furthermore, the IoT controller may generate an encrypted version of the link ring for each gateway with the IoT radio initial link key(s) inside, and may propagate them to the gateway when the network is set up. When the encrypted version of the link ring expires, it may be regenerated as a new encrypted version of the link key, but with the initial link key inside. Note that the gateway may access the access key in the IoT controller. This may preclude the need to either store the initial link key(s) or the access keys in the gateway. Consequently, the gateway may not need to be connected via an authenticated authorized link into the IoT controller, and may not have a copy of either the initial link key(s) or the access key, which prevent unintended access to these keys.

When an IoT PAN is initialized, a trust center or device may be provisioned with the initial link key by querying an MQTT channel using an identifier of the PAN and optionally the electronic device as a N-tuple identifying the scope of the initial link key. Moreover, once the access key is received from the IoT controller, it may be used to open the encrypted version of the link key to access the correct initial link key. Then, after the access key has been used, it may be discarded.

This approach may delegate hardening of a link key for a category of electronic devices, e.g., a link key for a single type of electronic device, such as electronic door locks, per installation, per location, etc. Consequently, the communication techniques may allow thousands of electronic devices to be provisioned with a common initial link key or a set of link keys, which is centrally managed and not distributed to a large number of locations, thereby narrowing the footprint of where the link key(s) are accessible. Therefore, the communication techniques may enable very large-scale deployments and may allow perishable access keys to be refreshed to protect the encrypted versions of the link keys and, thus, the link keys. For example, even a sophisticated attacker may have difficulty in obtaining the link keys from the gateways, because they are not openable at that level, and may only be accessible when an administrator is logged in to the IoT controller. By centralizing the bootstrapping and key hardening of IoT links, the IoT controller may become a true point of control in these approaches, and can be physically and logically isolated and hardened at a location to make an attack on the bootstrapping significantly harder than with other approaches.

In the IoT controller with a trusted device, the link keys for electronic devices, as well as frequently expiring access keys, may be stored in a trusted device. When constructing the system, a set of initial link keys may be inserted locally to the electronic devices, e.g., using a cable, and their scope-identifier value pairs may be stored in the trusted device of the IoT controller, along with a short-lived access keys per gateway. Once a gateway joins a network, its encrypted version of the link key may be generated. Notably, the encrypted version of the link key may include content, such as the set of scope-identifier value pairs of link keys for the gateway, and may be transmitted to the gateway over a secure MQTTS channel, and then stored on the gateway.

Next, when an electronic device is onboarded the gateway may request the access key from the IoT Controller and may use it in memory (such as random access memory) to open the local encrypted version of the link key. Moreover, the gateway may use the initial link key(s) in the encrypted version of the link key to establish the PAN credentials for each electronic device in the coordinator or equivalent trust center functionality for the link in the IoT radio.

Once the link security has been established for each electronic device, the gateway may discard the in-memory access key and the gateway may no longer have the credentials to locally read the initial link key. Consequently, the gateway may not need to have a local trusted device, which may reduce the cost and complexity of the communication techniques relative to existing approaches that require that the gateway include a trusted device. Instead, in the communication techniques, after installation there is no local access in the gateway to the link key.

In some embodiments, a gateway may be in a key access mode when an electronic device (such as an electronic lock) is commissioned. At the start of the commissioning of the electronic device, the gateway may request that an IoT controller pass down a strongly encrypted version of the link key if is not already available on the gateway and an access key. If the encrypted version of the link key exists, the request may pass an md5sum (which may calculate and verify a 128-bit MD5 hash) of the encrypted version of the link key for the IoT controller to determine if an upgrade to the encrypted version of the link key is needed to be sent from the IoT controller to the gateway (in addition to the access key) in the response over a secure MQTTS channel security link.

Once an access key is obtained, the gateway may pull the initial link key from the encrypted version of the link key and may inject it to the trust center over a secure host-network-coprocessor API. After this, the gateway may zero or erase the initial link key and the access key, which may have only briefly existed in the random access memory of the IoT gateway application.

Note that the IoT controller may have a small encrypted-mount partition (or trust envelope) for storing the encrypted versions of the link keys and access keys of its access points, together with their creation time(s) and possible expiration time(s). For example, the encrypted partition in the writable file system in the IoT controller may be mounted read-only, or a database equivalent dictionary may be enabled by policy. In some embodiments, when triggered by an operator or administrator scanning the electronic device, the key access mode may be enabled by the IoT controller requiring a mount password. This password may be kept briefly in memory for the partition mount or a special database dictionary access, and may be discarded or erased after a mount. Thus, when the key access mode is disabled, the encrypted partition may be unmounted.

When an electronic-device plugin in the IoT controller is configured, a deployment-unique or specific private initial link key may be injected while the IoT controller is in a key access mode for access to the encrypted partition for key storage. An encrypted version of the link key for storing the private link key may be created when the link key is injected into the encrypted partition, along with the previously mentioned metadata. In order to ensure rotation of the encrypted version of the link key, a non-zero expiration time may be used during this process. Note that when generation of the encrypted version of the link key occurs, the encrypted partition may be briefly read/write re-mounted, and then re-mounted read only for the rest of the duration of the key access mode.

Table 1 illustrates pseudocode for an access request (which is sometimes referred to as a 'key access request') from a gateway to an electronic-device plugin in an IoT controller. When the electronic-device plugin receives this message, it may access the mounted encrypted partition by sending the encrypted version of the link key if the value is empty (e.g., if there is no expiration time) and the access key. Alternatively, if a md5sum matches that of the local link key, the electronic-device plugin may send an empty field for the encrypted version of the link key along with the access key. Otherwise, the electronic-device plugin may send the encrypted version of the link key and the access key. Note that the encrypted version of the link key may be passed when a gateway joins a network, so that the encrypted version of the link key and the access key are not passed at the same time. However, an empty field for the encrypted version of the link key can, in this case, still be used in a key access message on join in order to allow for an inline mode.

TABLE 1

```
Topic: gateway/credentials
Payload:
    {
        "gateway_euid" : "<gateway mac id>",
        "device_type" : "electronic device",
        "attributes": [{
            "attribute": "KEY_ACCESS_REQUEST",
            "value" : "<md5-sum-of-link key-or-empty>"
        }]
    }
```

Table 2 illustrates pseudocode for an access response (which is sometimes referred to as a 'key access response') from an electronic-device plugin in an IoT controller to a gateway. When the gateway receives this access response, it may store the new encrypted version of the link key in place of an older or previous encrypted version of the link key if the command "KEY_ACCESS_RESPONSE" value is non-empty. Moreover, the gateway may use the access key to access the private initial link key for the electronic device from the encrypted version of the link key injected over the secure host interface to the trust center in the gateway. Then, the gateway may discard the access key and the link key (e.g., by zeroing their variable memory in the volatile memory of the gateway process).

TABLE 2

Topic: controller/gateway/credentials
Payload:
```
{
   "gateway_euid" : "11:22:33:44:55:66",
   "device_type" : "electronic device",
   "commands": [{
       "command": "KEY_ACCESS_RESPONSE",
       "payload":"<link key_data_base64 or empty>"
   }]
       "command":"ACCESS_KEY",
       "payload":"<access_key> or empty for key access failure"
   }]
}
```

Table 3 illustrates pseudocode for link key protection during link key generation and access. A link key may be protected in an encrypted version of the link key, which may be a base64 encoded key (as opposed to a fully encrypted version of the link key) using an open ssl in the gateway. For example, the following simplifies an encrypt-decrypt operation in a Unix system illustrates an implementation principle of a base64 encoded AES256-CBC encrypted link key.

TABLE 3 echo link key | openssl enc -aes-256-cbc -k access key | openssl enc -base64 >link key
cat link key | openssl base64 -d -A | openssl aes-256-cbc -d -k access key
Link key In some embodiments, the IoT controller may create an asymmetric RSA key (ssh keygen), which may be used to provide a private and a public key. The private and the public keys may be stored in a data structure (which may be, e.g., base64 encoded). When login credentials are received (e.g., via a user interface or API), the login credentials may be encrypted using the private key (which may create the access key) and may store the access key in a data structure (e.g., base 64 encoded).

In another embodiment a fully featured link key can be used, where the properties illustrated in simpler embodiments are available in a more advanced embodiment in the link key, e.g., with a gpg link key.

Then, when a gateway is approved or allowed, the public key may be sent to the gateway (e.g., via a new MQTT topic using the key access response), as well as unsolicited credentials. Note that there may be a time delay of, e.g., several seconds after the public key is sent to the gateway. This may ensure that, when unsolicited credentials are sent to the gateway, the gateway has the public key to decrypt them. Alternatively, when a solicited credential is requested, the requested credential (encrypted and/or encoded) may be passed to the gateway on a new MQTT topic.

For example, a type may be generic when the public key is shared and the payload may be the public key (encrypted and/or encoded). Moreover, type may be a particular electronic device when an associated link key is shared and the payload may be the link key (encrypted and/or encoded).

The communications techniques may address platform security in which an attack surface to platform security is reduced or minimized in order to hide access to the secret initial link key. This link key may be deployment-unique but may last the lifetime of the deployment, unless a technician walks through the electronic devices in the deployment and reprograms them with a new link key, and then provisions the new link key to the IoT controller.

Moreover, during a normal mode, the communications techniques may configure the gateway and the IoT controller so the secret initial link key cannot be found stored in cleartext and cannot be accessed with a container-opening key in cleartext. Consequently, an encrypted container with the link key may not be accessed on the gateway or the IoT controller during the normal mode.

Therefore, the only remaining attack to obtain the link key from the gateway or the IoT controller may be a brute-force attack on the encryption of the unmounted encrypted partition on the IoT controller and/or the link key on the gateway. This attack vector may be further mitigated by choosing a strong encryption for the encrypted partition and the encrypted version of the link key.

When the key access mode is enabled, there may be a short window of time during a device join operation when the link key or the encrypted version of the link key can be obtained from volatile memory outside of the aforementioned encrypted containers or from inside a mutually-authenticated mutually-authorized secure MQTTS tunnel. In order to increase or maximize the channel security and to reduce or minimize access, there may not be any persisting of key material in the MQTTS queues, and the gateway-IoT-controller MQTTS key distribution channel security setup may be secure. Also, the channel security to the trust center or device may be secure.

In some embodiments, the link key may be inserted into the IoT controller via a secure user interface of an administrator. For example, an API and secure widget that receive the secret initial link key may be hardened from Web or REST-API attacks, and the link key may only be stored in memory in a well-segregated container, such as a properly sandboxed iframe of a Web client or in a Web server to its IoT-controller business logic flow.

Moreover, the encrypted version of the link key may be an encrypted envelope with openssl, If the full infrastructure between the gateway and the IoT controller is too cumbersome to install, the encrypted version of the link key may be passed after a gateway joins a network to prevent the encrypted version of the link key and its access key from being passed at the same point, which may provide added security through channel separation.

In some embodiments, the access key may be further encrypted with a purpose-derived certificate rooted to the trusted device on the gateway. Such a rooted and hardened envelope may prevent an MQTT sniff from disclosing the link key, and may make this second level of protection required in order to access a mutually authenticated and authorized two-way hardened envelope.

Because root access or equivalent privileged administrator access on the gateway platform may open many venues to thwart the communication techniques, chow2 and ssh access may be turned off in a deployment of an electronic device under normal condition, so that a root shell or equivalent administrator access may only be achievable through a real exploit. Moreover, an additional check may be added against a social engineering attack, in which an administrator is tricked into opening access key access. For example, legal accesses may be counted and a warning popup may be shown to the administrator if an incorrect number of accesses are performed. This approach may require adding an access identifier and an access count to link key access messages. Furthermore, based at least in part on the number of key refresh exchanges and by counting the counters per gateway, it may be possible to track a replay or injection of an additional query during a window (i.e., during the key access mode). However, violations of this policy and the associated alerts may lead to re-bootstrap with a site-link key-refresh (in which a technician may change the link keys in installed electronic devices) for higher-security-class deployments.

We now describe embodiments of an electronic device, which may perform at least some of the operations in the communication techniques. FIG. 12 presents a block diagram illustrating an example of an electronic device 1200 in accordance with some embodiments, such as one of access points 110, one of electronic devices 112, one of services manager 114, one of computers 116 or computer 130. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, ASICs, microcontrollers, programmable-logic devices, one or more graphics processing units, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), and/or other types of memory. In some embodiments, instructions for processing subsystem 1210 in memory subsystem 1212 include: one or more program modules or sets of instructions (such as program instructions 1222 or operating system 1224), which may be executed by processing subsystem 1210. Note that the one or more computer programs or program instructions may constitute a computer-program mechanism. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), including: control logic 1216, an interface circuit 1218, an optional cable 1206 and one or more antennas 1220 (or antenna elements), which may be included in an optional antenna module 1230. (While FIG. 12 includes antenna module 1230, in some embodiments electronic device 1200 includes one or more nodes, such as nodes 1208, e.g., a pad, which can be coupled to antenna module 1230. Thus, electronic device 1200 may or may not include antenna modules 1230. Note that the one or more nodes 1208 may constitute input(s) to and/or output(s) from electronic device 1200.) For example, networking subsystem 1214 can include a Bluetooth™ networking system, a BLE networking system, a cellular networking system (e.g., a 3G/4G/5G network such as UMTS, LTE, etc.), a universal serial bus (USB) networking system, a networking system based at least in part on the standards described in IEEE 802.11 (e.g., a Wi-Fi® networking system), an Ethernet networking system, a ZigBee networking system, a Z-Wave networking system, a LoRaWAN networking system and/or another networking system.

Note that a transmit or receive antenna pattern (or antenna radiation pattern) of electronic device 1200 may be adapted or changed using pattern shapers (such as reflectors) in one or more antennas 1220 (or antenna elements), which can be independently and selectively electrically coupled to ground to steer the transmit antenna pattern in different directions. Thus, if one or more antennas 1220 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1200 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices as described previously.

Within electronic device 1200, processing subsystem 1210, memory subsystem 1212, and networking subsystem 1214 are coupled together using bus 1228. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc.

Electronic device 1200 can be (or can be included in) any electronic device with at least one network interface. For example, electronic device 1200 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. The integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used BLE, Ethernet, MQTT and a Wi-Fi communication protocols as illustrative examples, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1222, operating system 1224 (such as a driver for interface circuit 1218) or in firmware in interface circuit 1218. Note that the communication techniques may occur while processing system 1210 executes program instructions 1222. Thus, the communication techniques may be implemented at runtime of program instructions 1222. Alternatively or additionally, at least some of the operations in the communication techniques may be implemented in a physical layer, such as hardware in interface circuit 1218.

Moreover, while the preceding discussion illustrated embodiments of the communication techniques in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

Furthermore, the functionality of electronic device 1200 may be implemented using a single electronic device or a group of electronic devices, which may be located at a single location or which may be distributed at disparate geographic locations (such as a cloud-based computing system).

Additionally, while electronic device 1200 is shown including a single interface circuit 1218, in other embodiments functions of integrated circuit 1218 may be implemented using two or more integrated circuits, such as integrated circuits associated with different communication protocols or techniques.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device configured to securely distribute a link key to a gateway, comprising:
    a network node;
    an interface circuit communicatively coupled to the network node;
    a processor coupled to the interface circuit; and
    memory, coupled to the processor, configured to store program instructions, wherein, when executed by the processor, the program instructions cause the electronic device to perform operations, comprising:
        while an administrator is logged in via a computer that is different from the electronic device:
            receiving, at the interface circuit and associated with a second computer, the link key using a secure widget, wherein the link key facilitates secure communication via a link;
            after receiving the link key, creating, at the electronic device, an access key;
            generating, at the electronic device, an encrypted version of the link key based at least in part on the access key and the link key, wherein the access key enables access to the link key based at least in part on the encrypted version of the link key; and
            storing, at the electronic device, at least two of the link key, the access key and the encrypted version of the link key in a trusted envelope or partition in the memory with encryption;
        when the administrator logs out, disabling access to the trusted envelope, wherein access to the stored at least two of the link key, the access key and the encrypted version of the link key in the trusted envelope or the partition in the memory with encryption is only enabled when the administrator is logged in;
        when the administrator logs in via the computer again:
            re-enabling access to the trusted envelope;
            when the electronic device receives information that indicates that the gateway has joined a network, providing, from the interface circuit, the encrypted version of the link key addressed to the gateway; and
            when the electronic device receives, at the interface circuit and associated with the gateway, an access request for the access key, providing, from the interface circuit, the access key addressed to the gateway, wherein the access request is associated with an authorized second electronic device that is associated with the gateway and an entity that is different than the administrator; and
        when the administrator logs out again, disabling access to the trusted envelope.

2. The electronic device of claim 1, wherein the operations comprise storing metadata with the link key, the access key and the encrypted version of the link key in the trusted envelope; and
    wherein the metadata specifies when the access key was created and how long it is valid or when the access key expires.

3. The electronic device of claim 1, wherein the access key is created based at least in part on an administrator login credential.

4. The electronic device of claim 3, wherein the administrator credential comprises a password.

5. The electronic device of claim 1, wherein the access key is a random or a pseudorandom number.

6. The electronic device of claim 1, wherein the access key is created based at least in part on a policy or privilege associated with the administrator.

7. The electronic device of claim 1, wherein the encrypted version of the link key and the access key are provided using different communication channels.

8. The electronic device of claim 1, wherein the gateway comprises an access point or an eNodeB.

9. The electronic device of claim 1, wherein the link is associated with a ZigBee communication protocol.

10. The electronic device of claim 1, wherein the access key is further provided based at least in part on an authorization associated with the administrator, an identifier of the second electronic device or both.

11. A non-transitory computer-readable storage medium for use in conjunction with an electronic device, the computer-readable storage medium storing program instructions that, when executed by the electronic device, securely distributes a link key to a gateway by causing the electronic device to perform operations comprising:
    while an administrator is logged in via a computer that is different from the electronic device:
        receiving, at the electronic device and associated with a second computer, the link key using a secure widget, wherein the link key facilitates secure communication via a link;
        after receiving the link key, creating, at the electronic device, an access key;
        generating, at the electronic device, an encrypted version of the link key based at least in part on the access key and the link key, wherein the access key enables access to the link key based at least in part on the encrypted version of the link key; and
        storing, at the electronic device, at least two of the link key, the access key and the encrypted version of the link key in a trusted envelope or partition in a memory of the electronic device with encryption;
    when the administrator logs out, disabling access to the trusted envelope, wherein access to the stored at least two of the link key, the access key and the encrypted version of the link key in the trusted envelope or the partition in the memory with encryption is only enabled when the administrator is logged in;

when the administrator logs in via the computer again:
  re-enabling access to the trusted envelope;
  when the electronic device receives information that indicates that the gateway has joined a network, providing, from the electronic device, the encrypted version of the link key addressed to the gateway; and
  when the electronic device receives, associated with the gateway, an access request for the access key, providing, from the electronic device, the access key addressed to the gateway, wherein the access request is associated with an authorized second electronic device that is associated with the gateway and an entity that is different than the administrator; and
when the administrator logs out again, disabling access to the trusted envelope.

12. The non-transitory computer-readable storage medium of claim 11, wherein the operations comprise storing metadata with the link key, the access key and the encrypted version of the link key in the trusted envelope; and
  wherein the metadata specifies when the access key was created and how long it is valid or when the access key expires.

13. The non-transitory computer-readable storage medium of claim 11, wherein the encrypted version of the link key and the access key are provided using different communication channels.

14. A method for securely distributing a link key to a gateway comprising:
  by an electronic device:
  while an administrator is logged in via a computer that is different from the electronic device:
    receiving, at the electronic device and associated with a second computer, the link key using a secure widget, wherein the link key facilitates secure communication via a link;
    after receiving the link key, creating, at the electronic device, an access key;
    generating, at the electronic device, an encrypted version of the link key based at least in part on the access key and the link key, wherein the access key enables access to the link key based at least in part on the encrypted version of the link key; and
    storing, at the electronic device, at least two of the link key, the access key and the encrypted version of the link key in a trusted envelope or partition in a memory of the electronic device with encryption;
  when the administrator logs out, disabling access to the trusted envelope, wherein access to the stored at least two of the link key, the access key and the encrypted version of the link key in the trusted envelope or the partition in the memory with encryption is only enabled when the administrator is logged in;
  when the administrator logs in via the computer again:
    re-enabling access to the trusted envelope;
    when the electronic device receives information that indicates that the gateway has joined a network, providing, from the electronic device, the encrypted version of the link key addressed to the gateway; and
    when the electronic device receives, associated with the gateway, an access request for the access key, providing, from the electronic device, the access key addressed to the gateway, wherein the access request is associated with an authorized second electronic device that is associated with the gateway and an entity that is different than the administrator; and
  when the administrator logs out again, disabling access to the trusted envelope.

15. The method of claim 14, wherein the method comprises storing metadata with the link key, the access key and the encrypted version of the link key in the trusted envelope; and
  wherein the metadata specifies when the access key was created and how long it is valid or when the access key expires.

16. The method of claim 14, wherein the access key is created based at least in part on a policy or privilege associated with the administrator.

17. The method of claim 14, wherein the encrypted version of the link key and the access key are provided using different communication channels.

18. The method of claim 14, wherein the access key is a random or a pseudorandom number.

19. The method of claim 14, wherein the access key is further provided based at least in part on an authorization associated with the administrator, an identifier of the second electronic device or both.

* * * * *